(12) United States Patent
Sviercoski

(10) Patent No.: US 8,204,690 B2
(45) Date of Patent: Jun. 19, 2012

(54) ANALYTICAL EFFECTIVE TENSOR FOR FLOW-THROUGH COMPOSITES

(75) Inventor: Rosangela De Fatima Sviercoski, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 428 days.

(21) Appl. No.: 12/476,081

(22) Filed: Jun. 1, 2009

(65) Prior Publication Data

US 2010/0023279 A1    Jan. 28, 2010

Related U.S. Application Data

(60) Provisional application No. 61/130,938, filed on Jun. 3, 2008.

(51) Int. Cl.
*G01V 1/40* (2006.01)
*G01V 3/18* (2006.01)
*G01V 5/04* (2006.01)
*G01V 9/00* (2006.01)

(52) U.S. Cl. ......... 702/6; 702/2; 702/7; 702/11; 702/12; 703/5; 703/9

(58) Field of Classification Search ........... 702/6, 7, 702/12, 45, 150–153, 179, 196; 703/2, 5, 703/6, 9
See application file for complete search history.

(56) References Cited

U.S. PATENT DOCUMENTS

| | | | |
|---|---|---|---|
| 6,612,558 B1* | 9/2003 | Denzler et al. | 269/48.1 |
| 6,819,111 B2* | 11/2004 | Fanini et al. | 324/339 |
| 2003/0040894 A1* | 2/2003 | Miyori et al. | 703/6 |
| 2006/0277011 A1* | 12/2006 | Tardy et al. | 703/10 |
| 2008/0133186 A1* | 6/2008 | Li et al. | 703/2 |
| 2009/0281776 A1* | 11/2009 | Cheng et al. | 703/2 |

FOREIGN PATENT DOCUMENTS

WO    WO 2008020906 A2 *    2/2008

OTHER PUBLICATIONS

Durlofsky, L.J., "Numerical Calculation of Equivalent Grid Block Permeability Tensors for heterogeneous Porous Media", Water Resourses Research (1991) 27(5):699-708.*

Che J. et al, "Thermal conductivity of carbon nanotubes", Nanotechnology 11 (2000), pp. 65-69.*

Amaziane, B. et al., "Equivalent permeability and simulation of two-phase flow in heterogeneous porous media," *Computation Geosciences* (2001) 5:279-300.

(Continued)

*Primary Examiner* — Eliseo Ramos Feliciano
*Assistant Examiner* — Yaritza H Perez Bermudez
(74) *Attorney, Agent, or Firm* — Kermit D. Lopez; Melissa Asfahani; Luis M. Ortiz

(57) ABSTRACT

A machine, method and computer-usable medium for modeling an average flow of a substance through a composite material. Such a modeling includes an analytical calculation of an effective tensor $K^a$ suitable for use with a variety of media. The analytical calculation corresponds to an approximation to the tensor $\overline{K}$, and follows by first computing the diagonal values, and then identifying symmetries of the heterogeneity distribution. Additional calculations include determining the center of mass of the heterogeneous cell and its angle according to a defined Cartesian system, and utilizing this angle into a rotation formula to compute the off-diagonal values and determining its sign.

20 Claims, 12 Drawing Sheets

OTHER PUBLICATIONS

Cardwell, W. T. et al., "Average Permeabilities of Heterogeneous Oil Sands," *Trans. Am. Inst. Mining. Met. Pet. Eng.* (1944) pp. 34-42.

Chang, H.-C., "Multi-Scale Analysis of Effective Transport in Periodic Heterogeneous Media," *Chem. Eng. Commun.* (1982) 15:83-91.

Craster, R. V. et al., "Four-Phase Checkerboard Composites," *Siam J. Appl. Math* (2001) 61(6):1839-1856.

Durlofsky, L. J., "Numerical Calculation of Equivalent Grid Block Permeability Tensors for Heterogeneous Porous Media," *Water Resources Research* (1991) 27(5):699-708.

Durlofsky, L. J. et al., "A nonuniform coarsening approach for the scale-up of displacement processes in heterogeneous porous media," *Advances in Water Resources* (1997) 20(5-6):335-347.

Fiore, A. et al., "Phase matching using an isotropic nonlinear optical material," *Nature* (1998) 391:463-466.

Grabovsky, Y. et al., "Exact Relations for Effective Tensors of Composites: Necessary Conditions and Sufficient Conditions," *Commun. on Pure and Applied Math* (2000) vol. LIII, pp. 300-353.

Guérillot, D. et al., "An Integrated Model for Computer Aided Reservoir Description: Fromt Outcrop Study to Fluid Flow Simulations," *5th European Symposium on Improved Oil Recovery* (1989) Budapest, Apr. 25-27.

Hashin, Z. et al., "A Variational Approach to the Theory of the Effective Magnetic Permeability of Multiphase Materials," *Journal of Applied Physics* (1962) 33(10): 3125-3131.

Hashin, Z. et al., "A variational approach to the theory of the elastic behavior of multiphase materials," *J. Mech. Phys. Solids* (1963) 11(6):127-140.

Hollister, S. J., "Porous scaffold design for tissue engineering," *Nature Materials* (2005) 4:518-524.

Holzapfel, C. et al., "Fe-Mg Interdiffusion in $(Mg,Fe)SiO_3$ Perovskite and Lower Mantle Reequilibration," *Science* (2005) 309:1707-1710.

Jacquin, C. G. et al., "Heterogeneity and Effective Permeability of Porous Rocks: Experimental and Numerical Investigation," *Reservoir Characterization II* (1991) Academic Press, Inc., pp. 662-664.

Kamiński, M. et al., "Effective elastoplastic properties of the periodic composites," *Computational Materials Science* (2001) 22:221-239.

Keller, J. B., "Effective conductivity of periodic composites composed of two very unequal conductors," *J. Math. Phys.* (1987) 28(10):2516-2520.

Koutsourelakis, P. S., "Stochastic upscaling in solid mechanics: An exercise in machine learning," *Journal of Computational Physics* (2007) 226:301-325.

Milton, G. W., "Bounds on the complex permittivity of a two-component composite material," *J. Appl. Phys.* (1981) 52(8):5286-5293.

Mortola, S. et al., "Un problema di omogeneizzazione bidimensionale," *Rendiconti* (1985) LXXVIII:77-82.

Renard, P. et al., "A fast algorithm for the estimation of the equivalent hydraulic conductivity of heterogeneous media," *Water Resources Research* (2000) 36(12):3567-3580.

Sareni, B. et al., "Effective dielectric constant of random composite materials," *J. Appl. Phys* (1997) 81(5):2375-2383.

Singh, S. C. et al., "On the Presence of Liquid in Earth's Inner Core," *Science* (2000) 287:2471-2474.

Sviercoski, R. F. et al., "Analytical effective coefficient and a first-order approximation for linear flow through block permeability inclusions," *Computers and Mathematics with Applications* (2008) 55:2118-2133.

Sviercoski, R. F. et al., "Analytical Approximation for the Generalized Laplace Equation with Step Function Coefficient," *Siam J. Appl. Math* (2008) 68(5):1268-1281.

* cited by examiner

ANALYTICAL EFFECTIVE TENSOR FOR FLOW-THROUGH COMPOSITES

CROSS REFERENCE TO RELATED APPLICATION

This non-provisional patent application claims priority to U.S. Provisional Patent Application Ser. No. 61/130,938, filed on Jun. 3, 2008, and incorporated herein by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

Embodiments are generally related to data-processing systems and methods. Embodiments are additionally related to the field of computers and similar technologies, and in particular, to software utilized in this field. In addition, embodiments also relate to a method and machine for modeling the average flow of a substance through a composite material including calculating diagonal and off-diagonals values of effective tensors.

BACKGROUND OF THE INVENTION

The ability to predict average properties of flows through composite materials may have a high impact in many fields of science. Understanding how microscopic behaviors influence macroscopic behaviors on composite materials also will improve understanding of nanostructured materials, turbulence, and phase transitions, including detection of the range of failure of materials. The first step in this direction involves obtaining the effective properties of a composite.

Computing the effective conductivity tensor of a heterogeneous geological formation is important for obtaining accurate numerical simulations on large heterogeneous domains. This is relevant to a number of areas, including conventional and unconventional energy recovery, storage and management of, e.g., oil, water, carbon dioxide, underground wastes and for the study of earthquakes. A fine-scale numerical flow solution involving these applications generally requires orders of $10^6$-$10^9$ unknowns, which is infeasible to consider even with modern supercomputers. Therefore, simplified equations given by homogenizing or upscaling these systems are often applied. In such cases, the effective, or upscaled, tensor plays a crucial role, in that it accurately captures the subgrid heterogeneity. Traditionally, the computation involved in obtaining the upscaled or effective tensor for these systems has been accomplished numerically, and various algorithms and methods have been employed for upscaling by homogenization theory. The computational cost involved in obtaining the upscaled tensors, however, may be excessive. Special code design may be required that may also add to computational time and performance.

Because of its importance in reservoir modeling, numerical schemes have been implemented, which explicitly compute the effective coefficient. However, if at each numerical grid-cell the heterogeneous function changes (which is the case in practical applications), then the computational cost involved in obtaining the upscaled tensors may overcome the cost of solving the full fine-scale problem.

There exists a need, therefore, for a method of analytically computing the effective tensor in numerical simulators to obtain the effective tensor of a composite (heterogeneous) material, i.e., for an analytical procedure for approximating the effective tensor, $\overline{K}$ obtained by periodic homogenization, and applicable to general (non-periodic) and locally isotropic media. The motivation for obtaining approximate analytical forms stems from their computational efficiency, which makes such forms attractive for field scale simulations. Such forms are also attractive due their portability for use with existing numerical codes. Moreover, such forms can also be incorporated within numerical multi-scale schemes for speeding up such procedures.

The existence of an effective tensor derived from periodic homogenization and applicable to non-periodic media is based on the mathematical concept of G-convergence. The challenge in obtaining analytically an upscaled tensor applicable to general geometric description of the medium still remains. It can be verified by numerical experiments that, even though the heterogeneous description of the media may be given as locally isotropic, the effective tensor is, in general, anisotropic and full tensor.

Even though exact forms for obtaining an average effective tensor seem to rely on the geometric description of the medium, there are established upper and lower bounds known as the Voigt-Reiss' inequality as expressed by equation (1) below:

$$\left( \int_\Omega \frac{dx}{K(x)} \right)^{-1} \leq \overline{K} \leq \int_\Omega K(x)\,dx = K^h \leq \overline{K} \leq K^a \quad (1)$$

That is, the effective coefficient is between the harmonic and arithmetic averages, respectively. There are other known bounds, such as, for example, Hashin & Shtrikman, which is applicable to two-phase media only, and the Cardwell and Parson bounds. This latter formulation, however, has been demonstrated to be stricter than the equations above and also with a broader applicability.

SUMMARY OF THE INVENTION

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, an aspect of the present invention to provide a method, machine and computer-usable medium for modeling an average solution of flow-through composite materials.

It is another aspect of the present invention to provide a method, machine and computer-usable medium for computing analytically, the effective tensor to be incorporated in numerical simulators to obtain the above average flow solution.

The disclosed embodiments can implement an analytical form for computing the effective diffusion tensor when the variable coefficient is locally isotropic, $K(x)=k(x)I$, where $k(x)$ is a scalar function, not necessarily periodic, and may be defined as a step function. The upscaled tensor, provided by this method, approximates results derived from solving the periodic cell-problem in the context of classical homogenization theory. The diagonal values are derived by an averaging procedure of the Cardwell and Parsons bounds. The off-diagonals are computed from rotation of an angle related to the center of mass of the grid cell.

The disclosed method is applicable to a variety of scenarios. For example, such a methodology can be utilize to model crude oil recovery where Darcy's Law is the momentum equation (numerical simulations disclosed herein illustrate this application), oil shale recovery where Fick's law, or diffusion of concentration is considered, and more generally, to heat conduction provided by Fourier's law and current conduction by assuming Ohm's law. Given that the theory is derived from general elliptic problems, the results apply to nonlinear multiphase diffusion, and to linear elasticity theory, wherein this last approach utilizes the same methodology to computing the effective moduli. The present invention may be used to model the average flow of substances such as heat, liquids, gases, or combination of them.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments generally relate to modeling the average flow of a substance, including heat, liquid or gases, or a combination thereof, through a composite material. Embodiments also relate to machines capable of performing such modeling, and to methods of modeling. Note that as utilized herein, the variable $\bar{K}$ generally means "effective tensor." Thus, for example, effective tensors include the diagonals components $K_{11}$, $K_{22}$, and $K_{12}$ and $K_{21}$ the off-diagonals. Note that the effective tensors described herein may be anisotropic, i.e. when the diagonal components are different, and/or non-diagonal when the off-diagonals are nonzero. Such effective tensors can be utilized, according to the disclosed embodiments, for modeling, for example, crude oil recover, oil shale recover, heat conduction and so forth.

Figure 1:
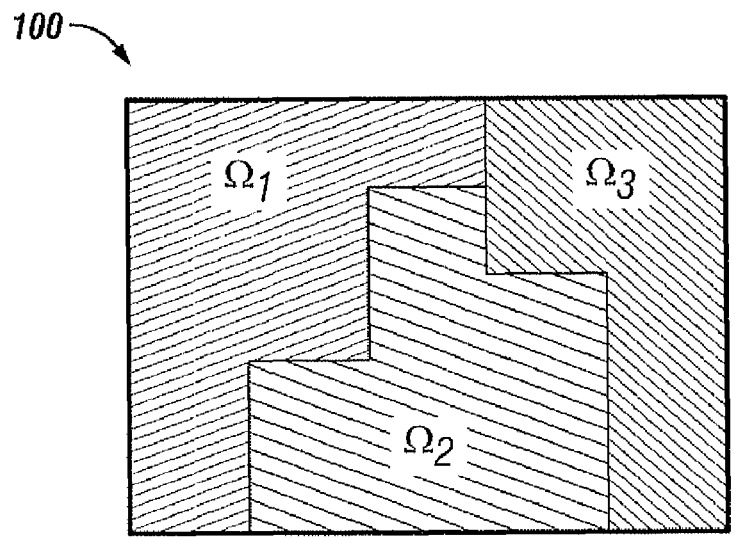
FIG. 1 depicts a schematic representation of a composite material described by the variable tensor (e.g., see equation 4), also corresponding to block 20 (e.g., B-20) depicted in FIG. 7, in accordance with an embodiment.
Figure 7:
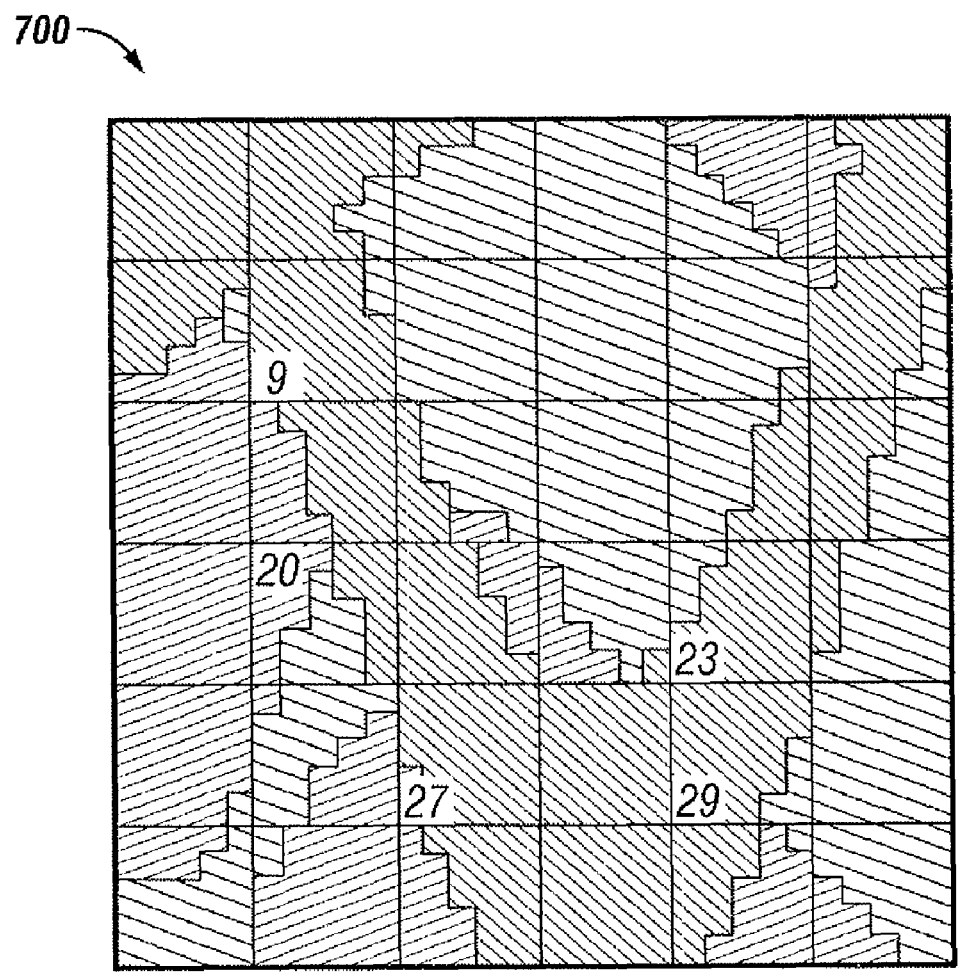
FIG. 7 depicts a reservoir, wherein on each selected block (total is 6×6) the darker color includes diagonal values of $K_{11}(x)=K_{22}(x)=0.1$, the intermediate color $K_{11}(x)=K_{22}(x)=1$ and the lighter color $K_{11}(x)=K_{22}(x)=10$, in accordance with an embodiment.

FIG. 1 depicts a schematic representation of a composite material 10 described by the variable tensor (e.g., see equation (4)), also corresponding to a particular block (B-20) depicted in FIG. 7, in accordance with an embodiment.

Figure 2:
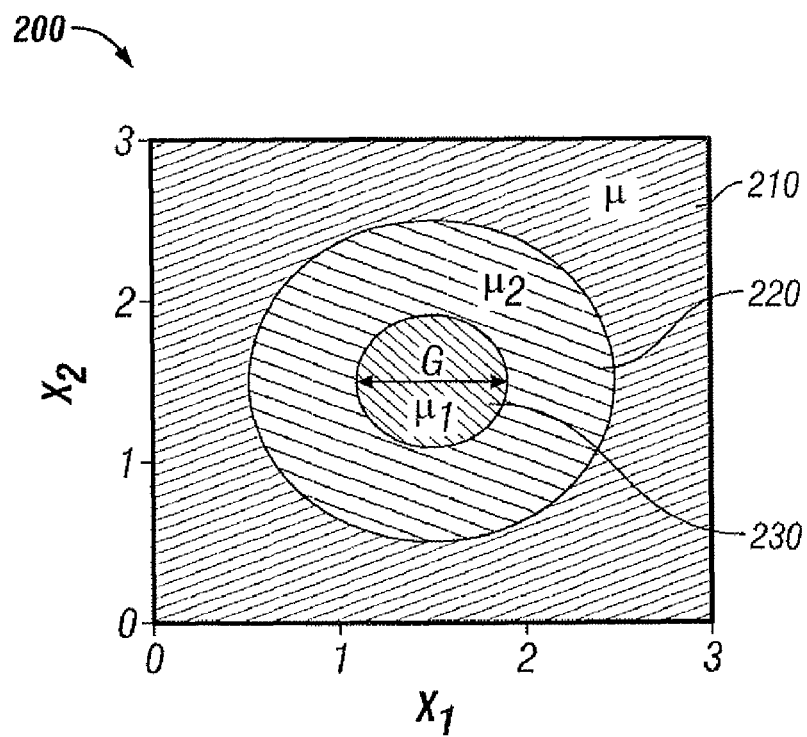
FIG. 2 depicts a geometry of coated circles, wherein the outside field of the external disk is homogeneous and has the effective value $\bar{\mu}$. The inner disk has radius $r_1$ and permeability $\mu_1$, higher than $\bar{\mu}$, whereas the outer circle has permeability $\mu_2$, lower than $\bar{\mu}$. The combination of $\mu_1$ and $\mu_2$ does not "disturb" the uniform external field with conductivity $\bar{\mu}$, in accordance with an embodiment.

FIG. 2 depicts a geometry of coated circles 20, wherein the outside field of the external disk is homogeneous and contains the effective value $\bar{\mu}$. The inner disk possesses a radius $r_1$ and a permeability $\mu_1$, higher than $\bar{\mu}$, whereas the outer circle possesses a permeability $\mu_2$, lower than $\bar{\mu}$. The combination of $\mu_1$ and $\mu_2$ does not "disturb" the uniform external field with a conductivity $\bar{\mu}$. The summary of results is presented in Table 1.

FIGS. 3(a)-(c) depict basic unit cells 30 with different shapes of inclusions and equal area of ¼ as derived from equations (2) and (5) herein.

Figure 4:
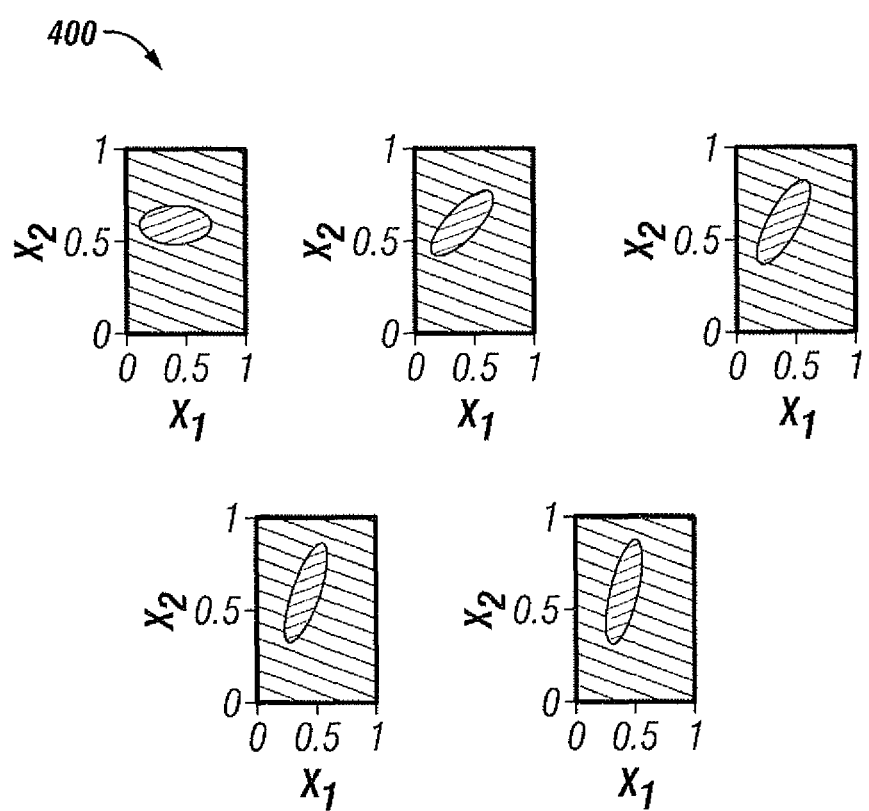
FIG. 4 depicts counterclockwise rotation of the elliptical inclusion from (left) to right by $\theta=\pi/6$, $\theta=\lambda/4$, $\theta=\pi/3$ and $\theta=1.2$ radians, respectively, in accordance with an embodiment.

FIG. 4 depicts a graphical representation 40 of the counterclockwise rotation of an elliptical inclusion from (left) to right by $\theta=\pi/6$, $\theta=\pi/4$, $\theta=\pi/3$ and $\theta=1.2$ radians, respectively. The area of the inclusion was preserved. Results are summarized in Table 3.

Figure 5:
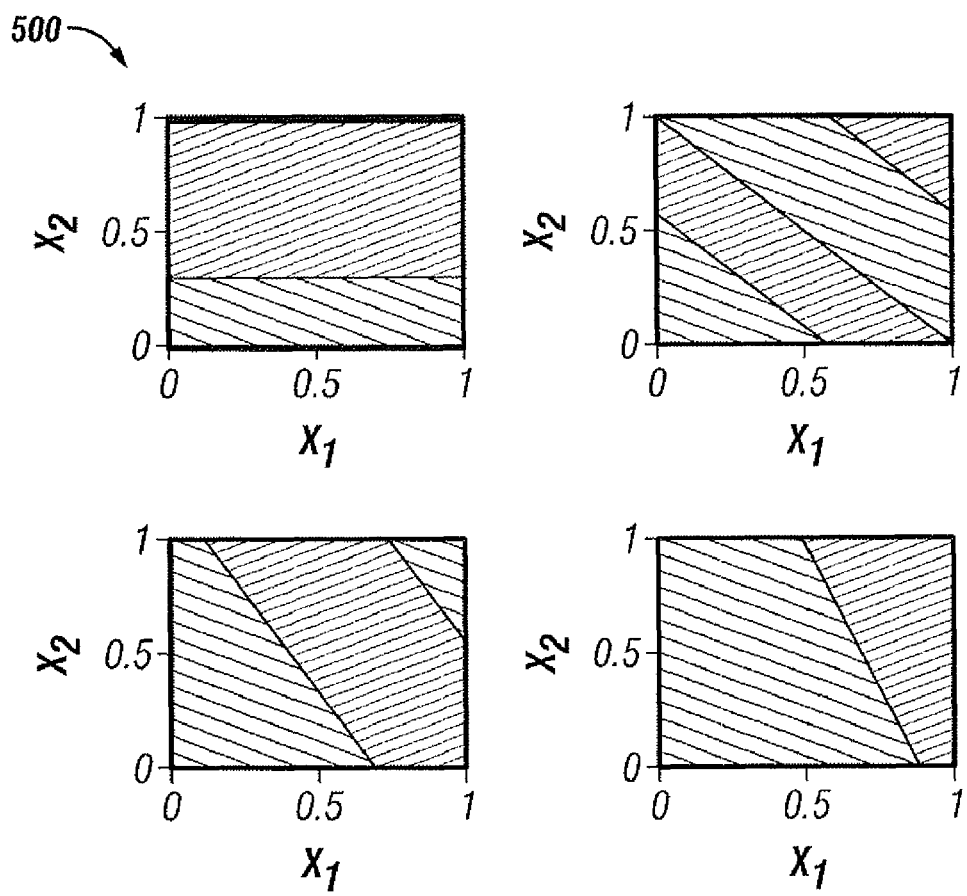
FIG. 5 depicts Layered medium configurations for the effective $K^a$ in accordance with an embodiment.

FIG. 5 depicts a configuration of a layered medium 50 for the effective $K^a$ presented in Table 4.

Figures 6A, 6B:
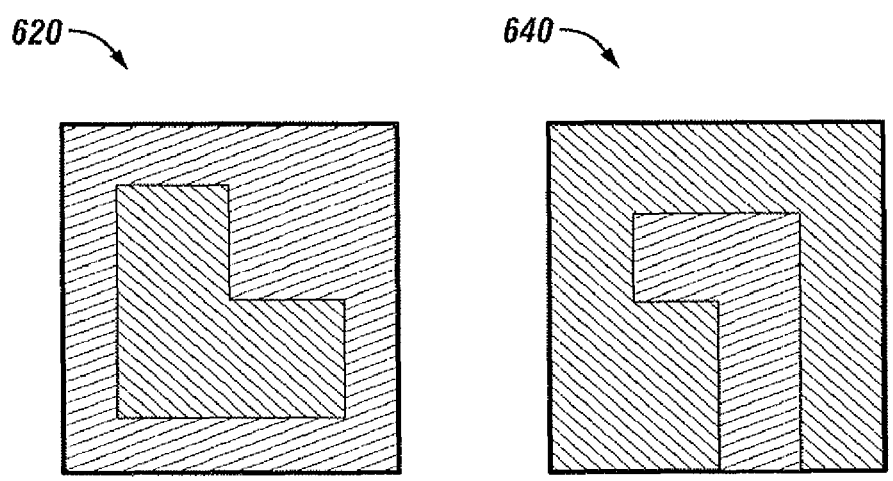
FIGS. 6(a)-(b) K(x) from [5] where $K_{11}(x)=K_{22}(x)=1$ in the matrix, and $K_{11}(x)=K_{22}(x)=10$ in the inclusion. K(x) from [3] with the opposite as the previous one, i.e. $K_{11}(x)=K_{22}(x)=10$ in the matrix and $K_{11}(x)=K_{22}(x)=1$ in the inclusion, in accordance with an embodiment.

FIGS. 6(a)-(b) depict K(x) from equation (5) where $K_{11}(x)=K_{22}(x)=1$ in the matrix, and $K_{11}(x)=K_{22}(x)=10$ in the inclusion. The parameter K(x) from equation (3) is included with the opposite arrangement from previous formulation (i.e. $K_{11}(x)=K_{22}(x)=10$) in the matrix and $K_{11}(x)=K_{22}(x)=1$, as indicated by respective areas 62 and 64. Results are summarized in Table 5.

FIG. 7 depicts a heterogeneous reservoir 70, and is adapted from Amaziane, B. et al., "Equivalent Permeability and Simulation of Two-Phase Flow in Heterogeneous Porous Media", Computational Geosciences 5:279-300, (2001), where on each selected block (total is 6×6) the darker color has diagonal values of $K_{11}(x)=K_{22}(x)=0.1$, the intermediate color $K_{11}(x)=K_{22}(x)=1$ and the lighter color $K_{11}(x)=K_{22}(x)=10$. The numerical tensor $\bar{K}$ can be obtained by solving 2 cell-problems (from equation (6)), for each heterogeneous block.

Calculating the Effective Tensor for Composite Material

Note that in the following description, the subscripts i,j can assume the values of 1 and/or 2 for the 2-dimensional case (i.e., i,j=1,2), without a loss of generality. It can be appreciated, of course, that the methodology disclose applies equally to 3-dimensional scenarios and the discussion of a 2-dimensional situation is presented for generally illustrative purposes only.

Given $K(x)=k(x)I$, $I \in M^{2 \times 2}$ the identity matrix, the goal is to find the effective tensor $\overline{K} \in M^{2 \times 2}$ and the $\overline{u}(x)$, the average or zeroth-order approximation of the classical Boundary Value Problem (BVP), defined on a bounded domain $\Omega \subset R^2$ as:

$$\begin{cases} -\nabla \cdot (K(x)\nabla u(x)) = f(x) & x \in \Omega \\ u(x) = g(x) & x \in \partial\Omega \end{cases} \approx \quad (2)$$

$$\begin{cases} -\nabla \cdot (\overline{K}\nabla \overline{u}(x)) = f(x) & x \in \Omega \\ \overline{u}(x) = g(x) & x \in \partial\Omega \end{cases}$$

where $u(x)$ and $\overline{u}(x)$ belong to $H^1(\Omega)$. The heterogeneous coefficient matrix, $K(x) \in L^\infty(\Omega)^{2 \times 2}$, is positive definite and, at each sub-domain $\Omega_\xi$ of $\Omega = \cup^p_{\xi=1}\Omega_\xi$ is defined as:

$$K(x) = k_\xi(x)I \quad x \in \Omega_\xi \quad (3)$$

with $k_{\xi(x)} \in (L^\infty(\Omega_\xi))$.

Using the notation above, the geometry from FIG. 1 is described as:

$$K(x) = \begin{cases} \begin{bmatrix} 1 & 0 \\ 0 & 1 \end{bmatrix} & \text{if } x \in \Omega_1 \\ \begin{bmatrix} 0.1 & 0 \\ 0 & 0.1 \end{bmatrix} & \text{if } x \in \Omega_2 \\ \begin{bmatrix} 10 & 0 \\ 0 & 10 \end{bmatrix} & \text{if } x \in \Omega_3 \end{cases} \quad (4)$$

$$\text{where } k(x) = \begin{cases} 1 & \text{if } x \in \Omega_1 \\ 0.1 & \text{if } x \in \Omega_2 \\ 10 & \text{if } x \in \Omega_3 \end{cases}$$

Note that the expression $\Omega = \Omega_1 \cup \Omega_2 \cup \Omega_3$ represents the unit cell with respect to equation (4) above. This is also the case with other developments discussed in greater detail herein.

From homogenization in periodic media, $\overline{K} \in M^{2 \times 2}$ is a positive definite matrix, defined as:

$$\overline{K} = \int_\Omega K(x) \begin{pmatrix} 1 + \frac{\partial w_1}{\partial x_1} & \frac{\partial w_1}{\partial x_2} \\ \frac{\partial w_2}{\partial x_1} & 1 + \frac{\partial w_2}{\partial x_2} \end{pmatrix} dx \quad (5)$$

where on each $e_i$-direction, $w_i(x) \in H^1(\Omega)$ is the solution of the periodic cell-problem:

$$\nabla(K(x)\nabla w_i(x)) = -\nabla(K(x)e_i) \quad x \in \Omega \quad (6)$$

Note that, even though $K(x)$ may not be periodic, $w_i(x)$ is periodic and satisfies the additional condition: $\int_\Omega w_i(x)dx = 0$.

In Sviercoski et al., "Analytical Approximation for the Generalized Laplace's Equation with Step Function Coefficient", SIAM Journal of Applied Mathematics, vol. 68 (5)—pp. 1268-1281, (2008), incorporated herein by reference, the analytical approximation to $w_i(x)$ in $L^2(\Omega)$:

$$\tilde{w}_i(x) = \int_0^{x_i} \frac{dx_i}{k(x)} \left( \int_0^1 \frac{dx_i}{k(x)} \right)^{-1} - x_i \quad (7)$$

was proposed for the special cases when $k(x)$ is a step function. The substitution of equation (7) into equation (5) leads to:

$$K_f = \begin{pmatrix} \int_0^1 \left( \int_0^1 \frac{dx_1}{k(x)} \right)^{-1} dx_2 & \int_0^1 k(x) \frac{\partial \tilde{w}_1}{\partial x_2} dx \\ \int_0^1 k(x) \frac{\partial \tilde{w}_2}{\partial x_1} dx & \int_0^1 \left( \int_0^1 \frac{dx_2}{k(x)} \right)^{-1} dx_1 \end{pmatrix} \quad (8)$$

It has also been shown that if $k(x)$ is periodic and has the symmetry property of its first moment being at half of the unit period, or another words, the center of mass be at (0.5,0.5), then the off-diagonals of (8) are zero, to give:

$$\tilde{K} = \begin{pmatrix} \int_0^1 \left( \int_0^1 \frac{dx_1}{k(x)} \right)^{-1} dx_2 & 0 \\ 0 & \int_0^1 \left( \int_0^1 \frac{dx_2}{k(x)} \right)^{-1} dx_1 \end{pmatrix} \quad (9)$$

The matrix $\tilde{K}$ coincides with the lower bound of $\overline{K}$ from Cardwell, W. T., Parsons, R. L., "Average Permeabilities of Heterogeneous Oils Sands", Trans. Am. Inst. Mining. Met. Pet. Eng. Pp. 34-42 (1944), from which the upper bound, $\hat{K}$, is defined as indicated by equation (10) below:

$$\hat{K} = \begin{pmatrix} \left( \int_0^1 \frac{dx_1}{\int_0^1 k(x)dx_2} \right)^{-1} & 0 \\ 0 & \left( \int_0^1 \frac{dx_2}{\int_0^1 k(x)dx_1} \right)^{-1} \end{pmatrix} \quad (10)$$

In the present invention, equations (9)-(10), known as Cardwell and Parsons bounds (CPB), is the two-sided estimate for the homogenized coefficient (5), i.e.:

$$\tilde{K} \leq \overline{K} \leq \hat{K}, \quad (11)$$

In other words, the lower bound is the arithmetic average of the harmonic on the direction parallel to the flow and the upper bound is the harmonic of the arithmetic on the direction perpendicular to the flow. It can be verified that these bounds apply to the general media discussed here and are stricter than (1) above. These bounds form the basis for defining the approximation to $\overline{K}$.

An Analytical Approximation to the Effective Tensor

The present invention provides an analytical approximation to the effective tensor for the 2-dimensional case, without loss of generality, as the 3-dimensional case should follow likewise. It can be appreciated that although a 2-dimensional scenario may be described, the methodology and embodiments as disclosed herein apply equally to 3-dimensional situations and parameters. The analytical approximation $K^å$ is empirical and results from extensive numerical experiments. Some of these numeral experiments, which are referred to in the literature, will be discussed in greater detail herein.

Definition 1. The diagonals of $K^å$, the approximation to $\overline{K}$ obtained from solving the periodic cell-problem (6), are defined as:

$$K_{ii}^å = 0.5(K_{ii}^a + K_{ii}^g) \quad (12)$$

where $K_{ii}^a$ and $K_{ii}^g$ are the arithmetic and geometric averages of the Cardwell and Parsons bounds (11), respectively.

A diagonal effective tensor given by the geometric average between the bounds has been previously proposed, in the context of computing the effective tensor by solving the cell-problem of equation (6) utilizing linear boundary conditions (LBC), instead of periodic conditions, as in the present case. Numerical results have demonstrated that LBC lead to different tensors for non-periodic media. In the context of the present invention, $K^g$ approximated well the numerical value of $\bar{K}$ for many cases, but underestimated them in many others. On the other hand $K^a$ did approximate well many cases, but overestimated others.

Therefore, equation (12) follows in order to minimize the error between the diagonal values of the approximation and $\bar{K}$.

To derive the off-diagonals of $K^{\mathring{a}}$, the assumption that an upscaled tensor can be obtained from a rotation of a diagonal matrix $P=\text{diag}(p_{11},p_{22})$ is considered, i.e. $K^{\mathring{a}}=QPQ^t$, wherein Q represents an orthogonal matrix. Next, the coordinates of the center of mass of the grid-cell, $$c_m = (y_1^c, y_2^c),$$

can be computed and referenced using a Cartesian system with the origin at the center of the cell $c=(c_1,c_2)$. Implying that $$|y_1^c| < c_1 \text{ and } |y_2^c| < c_2,$$

the angle that $c_m$ renders with the Cartesian system is $$\phi = \arctan\left(\frac{y_2^c}{y_1^c}\right).$$

Note that if the grid-cell possesses a unit volume, then $c=(0.5, 0.5)$.

It can be verified that P has diagonal elements $p_{11}=a_1+a_2$ and $p_{22}=a_1-a_2$, wherein $$a_1 = \frac{K_{ii}^{\mathring{a}} + k_{jj}^{\mathring{a}}}{2}, \quad a_2 = \frac{K_{ii}^{\mathring{a}} - K_{jj}^{\mathring{a}}}{2\cos(2\theta)}.$$

To ensure that P is well defined, $\theta=\phi/4$ is considered as the angle of rotation. Thus, the off-diagonals of $K^{\mathring{a}}$ is given as:

$$K_{ji}^{\mathring{a}} = K_{ij}^{\mathring{a}} = -a_2 \sin(2\theta) \text{ if } k_{ii}^{\mathring{a}} \neq K_{jj}^{\mathring{a}} \qquad (13)$$

$$K_{ji}^{\mathring{a}} = K_{ij}^{\mathring{a}} = -b_2 \sin(2\theta) \text{ if } K_{ii}^{\mathring{a}} = K_{jj}^{\mathring{a}} \qquad (14)$$

When $K_{ii}^{\mathring{a}}=K_{jj}^{\mathring{a}}$, numerical experiments indicated that the center of mass is along the line $y_1+\pm y_2$, the converse also showed to be true. Moreover, in these cases, the arithmetic and geometric averages were very close and $b_2$ in (14) was derived by considering that $K^{\mathring{a}}=K^a$. It can be shown that $K^a$ results from a rotation of $P^a=\text{diag}(p_{11}{}^a,p_{22}{}^a)$ where, $p_{11}{}^a=b_1+b_2$, $p_{22}{}^a=b_1-b_2$ and $$b_1 = \frac{\hat{K}_{ii} + \hat{K}_{jj}}{4} + \frac{\tilde{K}_{ii} + \tilde{K}_{jj}}{4}$$

and $$b_2 = \frac{\hat{K}_{ii} + \hat{K}_{jj}}{4} - \frac{\tilde{K}_{ii} + \tilde{K}_{jj}}{4},$$

for $\theta<\pi$. In particular, for $\theta=\pi/4$.

Since rotation of a matrix preserves its positive definiteness, the next result gives an additional condition on $\theta$ such that $K^{\mathring{a}}$ will be a positive definite matrix.

Lemma 1. Let $P=\text{diag}(p_{11},p_{22})$, with $p_{11}$ and $p_{22}$ defined as above. Then P will be a positive definite matrix, if and only if, $|\sin(2\theta)|<r<1$ wherein the variable r represents the ratio between the geometric and arithmetic averages between the diagonal components of $$[[K^{\mathring{a}}]]\underline{K^{\mathring{a}}}, \text{ or } r = \frac{\sqrt{K_{11}^{\mathring{a}} K_{22}^{\mathring{a}}}}{\frac{K_{11}^{\mathring{a}} + K_{22}^{\mathring{a}}}{2}}.$$

Proof: P will be positive definite, if and only if, $a_1{}^2-a_2{}^a=a$ with $a>0$. By definition of $a_1$ and $a_2$, a will be greater than zero, i.e., $$a = \left(\frac{K_{ii}^{\mathring{a}} + K_{jj}^{\mathring{a}}}{2}\right)^2 - \left(\frac{K_{ii}^{\mathring{a}} + K_{jj}^{\mathring{a}}}{2\cos(2\theta)}\right)^2 > 0,$$

if and only if, $$\tan^2(2\theta)\left(\frac{K_{11}^{\mathring{a}} + K_{22}^{\mathring{a}}}{2}\right)^2 < \frac{K_{11}^{\mathring{a}} K_{22}^{\mathring{a}}}{\cos^2(2\theta)} \Leftrightarrow$$

$$|\sin(2\theta)|^2 < \frac{4K_{11}^{\mathring{a}} K_{22}^r}{\left(K_{11}^{\mathring{a}} + K_{22}^{\mathring{a}}\right)^2} \Leftrightarrow |\sin(2\theta)| < \frac{\sqrt{K_{11}^r + K_{22}^{\mathring{a}}}}{\frac{K_{11}^{\mathring{a}} + K_{22}^{\mathring{a}}}{2}} = r.$$

Observation 1: Equations (13)-(14) are defined such that $K_{11}^{\mathring{a}} > K_{22}^{\mathring{a}}$, since $p_{11} > p_{22}$. If that is not the case, the off-diagonals will change the signs.

The procedure above does not account for the symmetry of $k(x)$ given by having the center of mass at the center $c_m=(c_1, c_2)$. When this is the case the off-diagonals of $\bar{K}$ has been proved to be zero. This symmetry is captured in this method by computing the off-diagonals of $\tilde{K}_f$ from (8).

In summary, the steps to compute the approximation $K^{\mathring{a}}$ to $\bar{K}$ from (5) are the following:

Step—1—Compute analytically the diagonal values from (12).

Step—2—Compute the off-diagonals of (8). If any of them is zero or near zero, then $k_{ij}^{\mathring{a}}=0$ $i \neq j$. If not, proceed to 3 and 4.

Step—3—Compute the center of mass $c_m$ of each cell and the angle of rotation, $\theta$, such that $r<1$. If not, keep dividing $\theta$ by 2 until this condition is satisfied.

Step—4—Compute the off-diagonals from (13) or (14), and determine its sign according to Observation 1.

From the results above, the following properties hold:

P1—The effective tensor satisfies the Voigt-Reiss inequality (1) and Cardwell and Parsons bounds (11).

P2—The effective tensor of a given medium $K(x)$ coincides with its rotation by $\pi$ radians.

To obtain accurate values for the off-diagonal is a challenging problem even by numerical means. This is because it involves the computation of the derivatives of a function, which requires a very fine grid, which most of the times is infeasible to consider. Therefore the errors in the off-diagonal may be large and highly dependent on the numerical discretization scheme. The computation above will show relatively good agreement with numerical results.

EXAMPLES

Comparison with a Known Analytical Result

Example 1

Analytical Effective Permeability (Magnetics)

This example is based on the classical work of Hashin, Z., Shtrikman, S., "Variational Approach to the Theory of the Effective Magnetic Permeability of Multiphase Materials", Journal of Applied Physics, vol. 33(16), (1962), where the effective permeability, in the context of Magnetics, was computed and confirmed by experiments. The question attempted to be answered was: Under what conditions will there be no change in the total energy stored in the body? This type of construction of a medium is sometimes called a self-consistent method.

The coated circles configuration, depicted in FIG. 2, corresponds to a 2-dimensional transverse slice of 3-D coated cylinders. Consider a homogeneous material with isotropic effective permeability $\bar{\mu}$. Suppose the medium is perturbed by a disk of unit radius (for example) that has an inner disk of radius $r_1 < 1$ which is filled with material $\mu_1$, and the annulus with radius $r_2$, where $r_1 < r_2 < 1$ ($r_1 + r_2 = 1$), is filled with material $\mu_2$. The mass fraction of $\mu_1$ is given by $f_1$ and $f_2 = 1 - f_1$ the fraction occupied by the material with permeability $\mu_2$.

Then the diagonal values of effective value can be computed, as indicated by equation (15) below:

$$\bar{\mu} = \mu_2 + \frac{2 f_1 \mu_2 (\mu_1 - \mu_2)}{2\mu_2 + f_2(\mu_1 - \mu_2)} \quad (15)$$

Table 1 indicates the good agreement between the effective values from (15) and diagonal values $\mu^{\text{a}}$ computed by (12), with $\mu_1 : \mu_2$ being the permeability ratio. The fact that for these geometries the upscaled tensor is diagonal is confirmed. The values of $r_1 = 0.4$ and $r_2 = 0.6$ were used and many others ratios and radius values were tested with similar agreement. The columns 3 and 5 of Table 1 are derived from equation (11). It is known that equation (15) may break down for high contrast ratio and when the cylinders or circles assemblage are close to touching each other. The analytical form of equation (15) is also known to be in agreement with the circle inclusion proposed by Maxwell, J. C., "A Treatise on Electricity and Magnetism", Oxford, United Kingdom: Clarendon Press, Article 314, pp. 365-367, (1873).

TABLE 1

| $\mu_1:\mu_2$ | $\bar{\mu}$ (15) | $\tilde{\mu}$ (9) | $\mu^{\text{a}}$ (12) | $\hat{\mu}$ (10) |
|---|---|---|---|---|
| 6:4 | 4.2645 | 4.2538 | 4.2659 | 4.2780 |
| 10:5 | 5.5634 | 5.5275 | 5.5727 | 5.6182 |
| 20:8 | 9.1779 | 9.0846 | 9.2122 | 9.3415 |

TABLE 1-continued

| $\mu_1:\mu_2$ | $\bar{\mu}$ (15) | $\tilde{\mu}$ (9) | $\mu^{\text{a}}$ (12) | $\hat{\mu}$ (10) |
|---|---|---|---|---|
| 100:5 | 6.6927 | 6.4461 | 7.0973 | 7.7798 |
| 1000:1 | 1.38 | 1.3203 | 1.5239 | 1.7421 |

Examples 2-5

Comparison with Numerical Results

Figure 3:
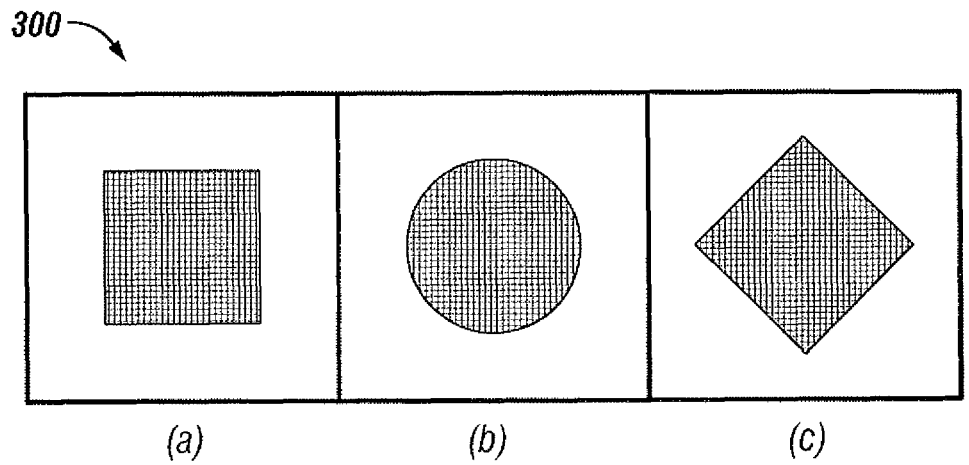
FIGS. 3(a)-(c) depict basic unit cells with different shapes of inclusions and equal area of ¼ from equations [2] and [5], in accordance with an embodiment.

Example 2 was considered since these inclusions are often cited in the literature and are illustrated in FIG. 3. Table 2 illustrates comparisons between the diagonal values of $K^{\text{a}}$ and their numerical counterpart for $\bar{K}$. The geometries are invariant under $\pi/2$ rotation and the inclusion occupies one-quarter of the total area. The best agreement between numerical and analytical are for the square inclusion. The circle and diamond have errors less than 4%, on average.

TABLE 2

| Geometry | ratio $\xi_1:\xi_2$ | $\bar{K}$ | $\tilde{K}$ (9) | $K^{\text{a}}$ (12) | $\hat{K}$ (10) |
|---|---|---|---|---|---|
| FIG. 3 (a) | 10:1 | 6.5 | 5.91 | 6.47 | 7.09 |
| FIG. 3 (a) | 100:1 | 59.2 | 51 | 58.45 | 67 |
| FIG. 3 (a) | 1:10 | 1.55 | 1.409 | 1.54 | 1.695 |
| FIG. 3 (b) | 1:10 | 1.52 | 1.403 | 1.58 | 1.791 |
| FIG. 3 (c) | 1:10 | 1.58 | 1.417 | 1.65 | 1.936 |

In Table 2, the ratio $\xi_1:\xi_2$, means that $\xi_1$ is the value at the matrix (or outside of the inclusion) and $\xi_2$ is the value at the inclusion. The tensors $\tilde{K}$ and $\hat{K}$ were computed from equation (9)-(10) and are shown to demonstrate the accuracy of inequality (11).

Examples 3 and 4 are presented to verify whether known properties of the effective tensor $\bar{K}$ are captured by the analytical approximation $K^{\text{a}}$. Even though the relative errors are computed with respect to the diagonal values of equation (12), one can observe that the off-diagonals are also in good agreement with the numerical results.

Example 3

Rotation of an Elliptical Inclusion

The experiment aims to address the following claim: Suppose that the effective conductivity of a composite, $\bar{K}$, is known; Then the same composite rotated by an arbitrary rotation tensor Q, has the effective conductivity given by $Q\bar{K}Q^t$.

This numerical experiment is applied to the geometries illustrated in FIG. 4, where the original elliptical inclusion is rotated by $\theta = \pi/6$ rd., eta $= \pi/4$ rd., $\theta = \pi/3$ rd. and $\theta = 1.2$ rd. respectively, with no stretching. The ellipses depicted in FIG. 4 can be obtained by setting its center at (0.4, 0.6) with major axis, a=0.3, and minor axis b=0.1 and $K_{11}(x) = K_{22}(x) = 10$ inside the inclusion and $K_{11}(x) = K_{22}(x) = 1$ outside, therefore ratio 1:10. The results are reported in Table 3.

TABLE 3

| angle (rd) | $\phi = 0$ | $\varphi = \dfrac{\pi}{6}$ | $\varphi = \dfrac{\pi}{4}$ | $\varphi = \dfrac{\pi}{3}$ | $\phi = 1.2$ |
|---|---|---|---|---|---|
| $\overline{K}$ | $\begin{pmatrix} 1.31 & 0 \\ 0 & 1.15 \end{pmatrix}$ | $\begin{pmatrix} 1.27 & 0.07 \\ 0.07 & 1.20 \end{pmatrix}$ | $\begin{pmatrix} 1.23 & 0.08 \\ 0.08 & 1.23 \end{pmatrix}$ | $\begin{pmatrix} 1.20 & 0.07 \\ 0.07 & 1.27 \end{pmatrix}$ | $\begin{pmatrix} 1.17 & 0.0605 \\ 0.0605 & 1.29 \end{pmatrix}$ |
| $K^{\text{å}}$ | $\begin{pmatrix} 1.33 & 0 \\ 0 & 1.14 \end{pmatrix}$ | $\begin{pmatrix} 1.28 & 0.03 \\ 0.03 & 1.20 \end{pmatrix}$ | $\begin{pmatrix} 1.24 & 0.06 \\ 0.06 & 1.24 \end{pmatrix}$ | $\begin{pmatrix} 1.20 & 0.02 \\ 0.02 & 1.27 \end{pmatrix}$ | $\begin{pmatrix} 1.18 & 0.03 \\ 0.03 & 1.29 \end{pmatrix}$ |

The agreement between the diagonal values of $K^{\text{å}}$ and $\overline{K}$ illustrates that the analytical procedure involves capturing the rotation behavior of the effective media, as expected. It can be verified that by performing the rotation of the left most matrix, and call it P, by the various angles, one attains the respective effective tensor. When there is a change on the mass fraction, then the experiments indicated that the rotation property does not follow, and that is illustrated in the next example.

Example 4

Layer Configurations

Because layered media is of importance for simulating flow and transport in geological formations, this experiment computes $K^{\text{å}}$ for the various configuration illustrated in FIG. 5 with $K_{11}(x)=K_{22}(x)=1$ on the bottom of the layer and $K_{11}(x)=K_{22}(x)=10$ on the top. The goal is to show the agreement between $K^{\text{å}}$ and $\overline{K}$, particularly for the diagonal values. Table 4 indicates the satisfactory agreement between the numerical and analytical $K^{\text{å}}$, particularly among the diagonal values.

TABLE 4

| $\overline{K}$ | $\begin{pmatrix} 7.34 & 0 \\ 0 & 2.74 \end{pmatrix}$ | $\begin{pmatrix} 3.13 & -1.52 \\ -1.52 & 3.13 \end{pmatrix}$ | $\begin{pmatrix} 2.60 & -0.36 \\ -0.36 & 4.37 \end{pmatrix}$ | $\begin{pmatrix} 1.52 & -0.08 \\ -0.08 & 3.24 \end{pmatrix}$ |
|---|---|---|---|---|
| $K^{\text{å}}$ | $\begin{pmatrix} 7.34 & 0 \\ 0 & 2.74 \end{pmatrix}$ | $\begin{pmatrix} 2.90 & -0.59 \\ -0.59 & 2.90 \end{pmatrix}^{\dagger}$ | $\begin{pmatrix} 2.62 & -0.13 \\ -0.13 & 4.25 \end{pmatrix}$ | $\begin{pmatrix} 1.53 & -0.12 \\ -0.12 & 3.06 \end{pmatrix}$ |

Example 5

L-Shape Inclusions

This example, cited in the literature, illustrates the computation of the effective tensor by numerical means and by using Steps 1-4 above for the geometries illustrated in FIG. 6. Results are given in Table 5, which shows a very good agreement with numerical results. The average errors between the diagonal and off-diagonal values are less than 2%.

TABLE 5

| Values | L-shape | Inverted - L |
|---|---|---|
| $\overline{K}$ | $\begin{pmatrix} 1.915 & -0.101 \\ -0.101 & 1.915 \end{pmatrix}$ | $\begin{pmatrix} 5.332 & -0.286 \\ -0.286 & 6.761 \end{pmatrix}$ |
| $K^{\text{å}}$ | $\begin{pmatrix} 1.89 & -0.098 \\ -0.098 & 1.89 \end{pmatrix}$ | $\begin{pmatrix} 5.330 & -0.288 \\ -0.288 & 6.714 \end{pmatrix}$ |

Example 6

A Realistic Reservoir

This example was derived from Amaziane, B. et al., "Equivalent Permeability and Simulation of Two-Phase Flow in Heterogeneous Porous Media", Computational Geosciences 5:279-300, (2001), wherein various numerical approaches are presented to compute the effective tensor for each block of the heterogeneous reservoir illustrated in FIG. 7. K(x) was adapted from the reference above, wherein at each selected block (total is 6×6), the darker color includes diagonal values of $K_{11}(x)=K_{22}(x)=0.1$, the intermediate color $K_{11}(x)=K_{22}(x)=1$ and the lighter color $K_{11}(x)=K_{22}(x)=10$.

In this example, each $\overline{K}$ was obtained by solving 2 cell-problems as in equation (6), for each heterogeneous block. Results are summarized in Table 6.

TABLE 6

Comparison between $K^{+}$ (left on each block) using [Steps-1]-[Steps-4], and numerical values $\overline{K}$. The values are $K^{*}_{11}$, $K^{*}_{12} = K^{*}_{21}$, $K^{*}_{22}$ of each block respectively from top to bottom, where block B-1 is the upper left on FIG. 7. The overall average error, between $E \neq 0$, is less than 2.5%. The $\neq$ signs and § are explained in the text.

| $K^{+}$ | $\overline{K}$ | $K^{+}$ | $\overline{K}$ | $K^{+}$ | $\overline{K}$ | $K^{+}$ | $\overline{K}$ | $K^{+}$ | $\overline{K}$ | $K^{+}$ | $\overline{K}$ |
|---|---|---|---|---|---|---|---|---|---|---|---|
| B-1 | | B-2 | | B-3 | | B-4 | | B-5 | | B-6 | |
| 10.0000 | 10.0000 | 3.7148 | 6.9894 | 0.1817 | 0.1783 | 0.1000 | 0.1000 | 0.4426 | 0.4497 | 3.3819 | 3.4402 |
| 0.0000 | 0.0000 | 0.1806 | 0.0004 | 0.0101 | 0.0119 | 0.0090 | 0.0900 | -0.0295 | -0.0416 | 0.0083 | 0.9000 |
| 10.0000 | 10.0000 | 7.0737 | 7.2309 | 0.1425 | 0.1391 | 0.1000 | 0.1000 | 0.4426 | 0.4496 | 7.3095 | 7.4172 |

TABLE 6-continued

Comparison between K⁺ (left on each block) using [Steps-1]-[Steps-4], and numerical values $\overline{K}$. The values are $K^*_{11}$, $K^*_{12} = K^*_{21}$, $K^*_{22}$ of each block respectively from top to bottom, where block B-1 is the upper left on FIG. 7. The overall average error, between E ≠ 0, is less than 2.5%. The ≠ signs and § are explained in the text.

| K⁺ | $\overline{K}$ | K⁺ | $\overline{K}$ | K⁺ | $\overline{K}$ | K⁺ | $\overline{K}$ | K⁺ | $\overline{K}$ | K⁺ | $\overline{K}$ |
|---|---|---|---|---|---|---|---|---|---|---|---|
| B-7 | | B-8‡ | | B-9 | | B-10 | | B-11 | | B-12 | |
| 3.8900 | 3.8392 | 7.4378 | 7.8600 | 0.1000 | 0.1000 | 0.1000 | 0.1000 | 0.1141 | 0.1092 | 4.6236 | 4.3470 |
| 0.2745 | 0.1912 | −0.1546 | 0.0000 | 0.0000 | 0.0000 | 0.0000 | 0.0000 | 0.0036 | 0.0000 | 0.1496 | 0.1795 |
| 2.6353 | 2.7202 | 8.8458 | 8.8100 | 0.1000 | 0.1000 | 0.1000 | 0.1000 | 0.1141 | 0.1092 | 8.8453 | 8.821 |
| B-13 | | B-14 | | B-15 | | B-16 | | B-17 | | B-18 | |
| 1.0000 | 1.0000 | 3.6315 | 2.5889 | 0.2362 | 0.2432 | 0.1000 | 0.1000 | 0.2064 | 0.2015 | 0.2208 | 0.2179 |
| 0.0000 | 0.0000 | −0.2106 | −0.0787 | −0.1468 | −0.0101 | 0.0000 | 0.0000 | 0.1851 | 0.0120 | 0.2054 | 0.0001 |
| 1.0000 | 1.0000 | 5.0135 | 5.7037 | 2.3647 | 2.3542 | 0.1000 | 0.1000 | 2.8539 | 8.0002 | 4.3782 | 4.3335 |
| B-19 | | B-20 | | B-21 | | B-22 | | B-23 | | B-24 | |
| 1.0000 | 1.0000 | 0.0297 | 0.6353 | 5.1600 | 5.2078 | 0.3297 | 0.2141 | 5.7148 | 5.8156 | 0.1233 | 0.1252 |
| 0.0000 | 0.0000 | −0.1519 | 0.0064 | −0.2309 | −0.229 | 0.0060 | −0.002 | 0.2177 | 0.4581 | 0.0100 | 0.0000 |
| 1.0000 | 1.0000 | 2.5731 | 2.5881 | 7.1304 | 7.1784 | 0.3116 | 0.3155 | 7.0737 | 7.2970 | 0.2855 | 0.3577 |
| B-25 | | B-26 | | B-27 | | B-28 | | B-29 | | B-30 | |
| 0.9122 | 0.9347 | 0.2144 | 0.2081 | 8.1089 | 8.2471 | 10.0000 | 10.0000 | 5.7148 | 5.8156 | 0.1000 | 0.1000 |
| 0.0170 | 0.0000 | 0.0108 | 0.0140 | −0.1034 | 0.0000 | 0.0000 | 0.0000 | 0.2177 | 0.4386 | 0.0000 | 0.0000 |
| 0.9122 | 0.9316 | 0.2845 | 0.2735 | 8.7896 | 8.9011 | 10.0000 | 10.0000 | 7.0737 | 7.2909 | 0.1000 | 0.1000 |
| B-31 | | B-32 | | B-33 | | B-34 | | B-35 | | B-36 | |
| 0.2106 | 0.2060 | 0.7063 | 0.7137 | 2.5389 | 2.3058 | 10.0000 | 10.0000 | 1.6357 | 1.6823 | 0.1606 | 0.1597 |
| 0.0310 | 0.0017 | 0.01703 | 0.0000 | −0.3370 | −0.078 | 0.0000 | 0.0000 | 0.1855 | 0.0479 | −0.0053 | −0.0100 |
| 0.1453 | 0.1466 | 0.8331 | 0.8640 | 6.2909 | 3.3132 | 10.0000 | 10.0000 | 3.8906 | 3.9697 | 0.1606 | 0.1697 |

The following points are noted: There is a good agreement between the diagonal values given by equation (12) and the numerical results, with less than 2.5% overall average error. Block 29, noted with §, results from a rotation of πrd, of block 23, therefore they have the property P2 above, and the analytical as well as the numerical values reflected this. Block 9 results from a rotation of πrd. of block 27, therefore they have the property P2 above, and the analytical as well as the numerical values reflected this.

Figure 8:
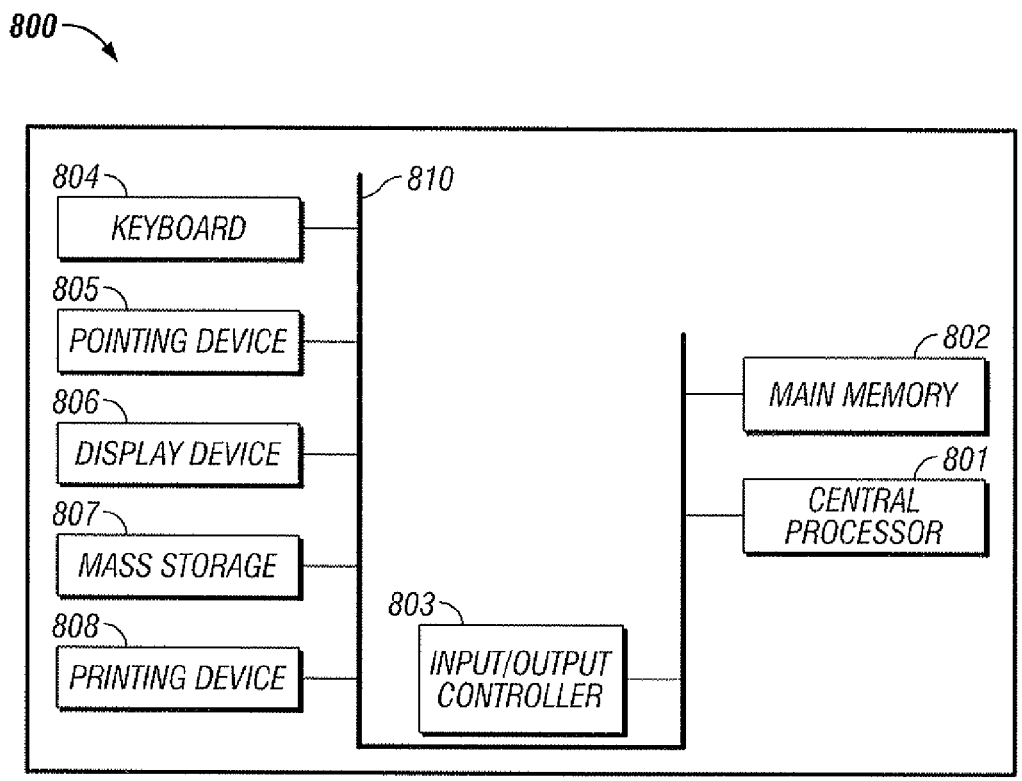
FIG. 8 depicts a block diagram of a machine (e.g., a data-processing apparatus), which may be utilized to implement an embodiment of the present invention.
Figure 9:
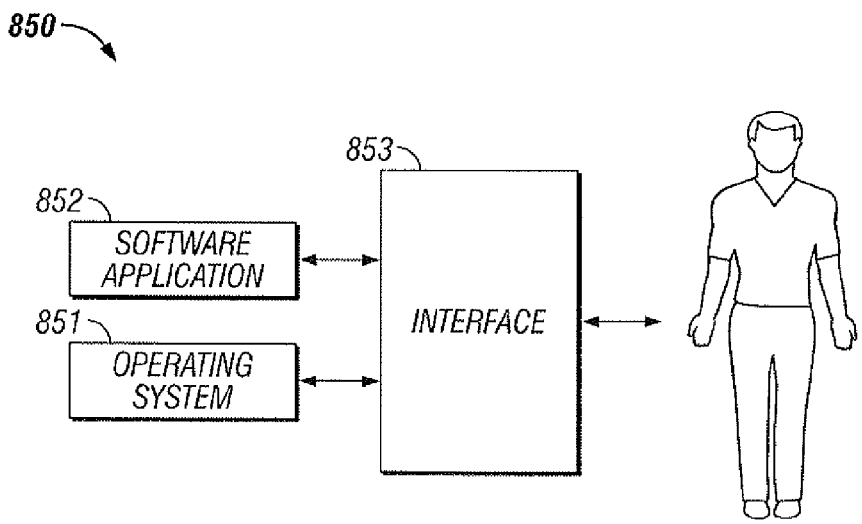
FIG. 9 depicts a schematic view of a software system including an operating system, application software, and a user interface that may be utilized for carrying out an embodiment of the present invention.
Figure 10:
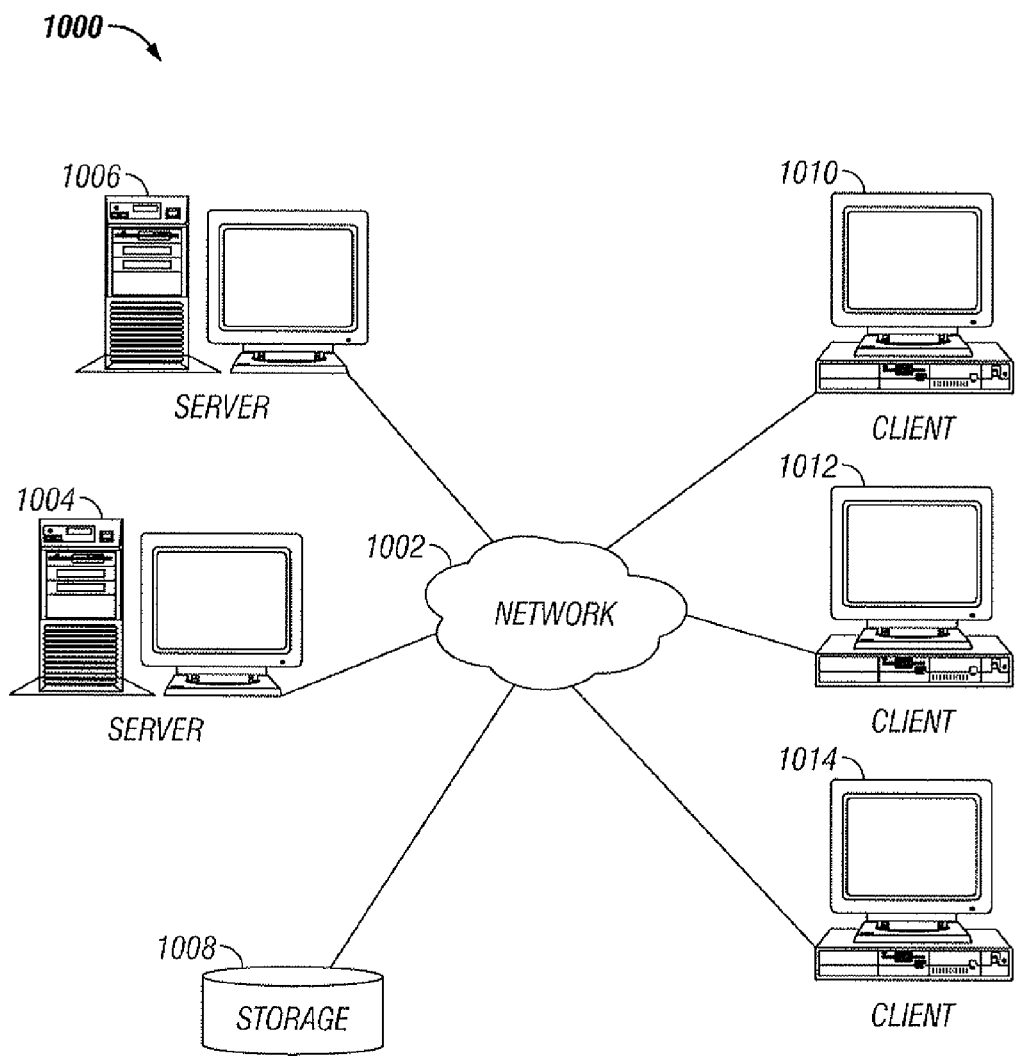
FIG. 10 depicts a graphical representation of a machine constituting a network of data processing systems, in which aspects of the embodiments may be implemented.

As indicated herein, a machine, such a computer, may be utilized to implement and process the instructions indicated herein. There are many examples of devices and systems that may be utilized to implement such a machine. FIGS. 8, 9, and 10 are therefore provided as exemplary diagrams of a machine, including data processing environments thereof, in which embodiments of the present invention may be implemented. It should be appreciated that FIGS. 8, 9, and 10 are only exemplary and are not intended to assert or imply any limitation with regard to the environments in which aspects or embodiments of the present invention may be implemented. Many modifications to the depicted environments may be made without departing from the spirit and scope of the present invention.

FIG. 8 illustrates a block diagram of a machine 800 (e.g., a data-processing apparatus/computer), which may be utilized to implement an embodiment of the present invention. Machine 800 generally includes a central processor 801, a main memory 802, an input/output controller 803, a keyboard 804, a pointing device 805 (e.g., mouse, track ball, pen device, or the like), a display device 806, and a mass storage 807 (e.g., hard disk). Additional input/output devices, such as a printing device 808, may be included in association with the machine 800 as desired. As illustrated, the various components of the machine 800 can communicate through a system bus 810 or similar architecture.

FIG. 9 illustrates an example of a machine 850, in this case a computer software system 850 that may be provided for directing the operation of the data-processing apparatus or machine 800. The "machine" or system 850, which is stored in system memory 802 and/or in disk memory 807, can include a kernel or operating system 851 and a shell or interface 853. One or more application programs, such as application software 852, may be "loaded" (i.e., transferred from storage 807 into memory 802) for execution by the data-processing apparatus or machine 800. The machine 800 can receive user commands and data through a user interface 853; these inputs may then be acted upon by the machine 800 in accordance with instructions from operating module 851 and/or application module 852.

The interface 853 is preferably a graphical user interface (GUI). In one potential embodiment, operating system 851 and interface 853 can be implemented in the context of a "Windows" system. Application module 852, on the other hand, can include instructions, such as for directing the various operations described herein, such as, for example, the instructions respectively depicted in FIGS. 1-7.

FIG. 10 illustrates a graphical representation of a machine 1000 composed of a network data processing system in which aspects of the disclosed embodiments may be implemented. The machine or network data processing system 1000 can be configured as a network of machines, such as, for example, machine 800. The machine or network data processing system 1000 generally contains a network 1002, which is the medium used to provide communications links between various machines. Network 1002 may include connections, such as, for example, wire, wireless communication links, or fiber optic cables.

In the depicted example, server 1004 and server 1006 connect to network 1002 along with storage unit 1008. In addition, clients 1010, 1012, and 1014 connect to network 1002. These clients 1010, 1012, and 1014 may be machines such as, for example, personal computers or network computers. Machine 800 depicted in FIG. 8 can be, for example, a client such as client 1010, 1012, and/or 1014. Alternatively, machine 800 can be implemented as a server, such as servers 1004 and/or 1006, depending upon design considerations.

In the depicted example, server 1004 provides data, such as boot files, operating system images, and applications to clients 1010, 1012, and 1014. Clients 1010, 1012, and 1014 are clients to server 1004 in this example. Network data processing system 1000 may include additional servers, clients, and other devices not shown. Specifically, clients may connect to any member of networks of servers which provide equivalent content.

In the depicted example, network data processing system 1000 is the Internet with network 1002 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 1000 also may be implemented as a number of different types of networks, such as, for example, an intranet, a local area network (LAN), or a wide area network (WAN). FIG. 10 is intended as an example and not as an architectural limitation for different embodiments of the present invention.

The following description is presented with respect to embodiments of the present invention, which can be embodied in the context of a data-processing system such as machine 800, computer software system 850 and data processing system 1000 and network 1002 depicted respectively FIGS. 9-10. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Note that in some embodiments, the various logical operational steps of the methodology disclosed herein with respect to FIGS. 1-7 and FIGS. 11-16 may be implemented as instructions in the context of a computer-usable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to Random Access Memory (RAM), and communication media, such as computer and telephone networks including Ethernet, the Internet, wireless networks, and like network systems.

It should be understood, therefore, that such signal-bearing media when carrying or encoding computer readable instructions of the methods of FIGS. 1-7 and FIGS. 11-16 that direct method functions of the present invention, may represent alternative embodiments of the present invention. Further, it is understood that the present invention may be implemented by a machine (e.g., a system) such as machine 800 having components or modules in the form of hardware, software, or a combination of software and hardware as described herein or their equivalent. Thus, the method described herein can be deployed as process software in the context of a machine (computer system or data-processing apparatus and/or system) as that depicted and described herein with respect to FIGS. 8, 9, and 10.

FIGS. 11-16 generally illustrate screen shots of data plots/graphs indicative of average numerical simulations obtained by using the upscaled tensor, consistent with disclosed embodiments. FIGS. 11-16 generally indicate fine-scale flow solutions compared with the upscaled solutions. The goal is to demonstrate that by using the analytical effective tensor within a numerical simulation, expected convergence results can be achieved. The results discussed herein corroborate with theoretical data from homogenization literature, by successive refinement/coarsening of a given heterogeneous media. Three test cases are described below in greater detail, including the SPE10 Comparative Solution Project.

A comparison can be made between the heterogeneous solution—by solving the equation (16) on the left—and the upscaled solutions—by solving the equation (16) on the right. These flow solutions are illustrated in FIGS. 11-16. The equation (16) describes steady-state flow from left to right, with no-flow on the top and bottom of a 2-dimensional domain $\Omega=[0,x_{d1}]\times[0,x_{d2}]$. These correspond to a solution as indicated equations (16) below (also describe herein as BVP):

$$\begin{cases} \nabla \cdot (K(x)\nabla u(x)) = 0 & x \in \Omega \\ u(0, x_2) = 10, u(x_{D1}, x_2) = 1 & x \in \partial\Omega \\ \frac{\partial u}{\partial \eta}(x_1, 0) = \frac{\partial u}{\partial \eta}(x_1, x_{D2}) = 0 & x \in \partial\Omega \end{cases} \approx \quad (16)$$

$$\begin{cases} \nabla \cdot \left(K^{\mathring{a}}(x)\nabla u^{\mathring{a}}(x)\right) = 0 & x \in \Omega \\ u^{\mathring{a}}(0, x_2) = 10, u^{\mathring{a}}(x_{D1}, x_2) = 1 & x \in \partial\Omega \\ \frac{\partial u^{\mathring{a}}}{\partial \eta}(x_1, 0) = \frac{\partial u^{\mathring{a}}}{\partial \eta}(x_1, x_{D2}) = 0 & x \in \partial\Omega \end{cases}$$

Figure 11:
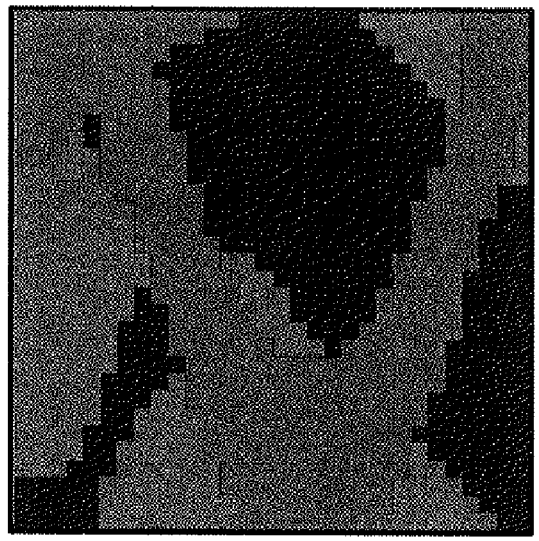
FIGS. 11-16 illustrate varying screen shots of plots/graphics indicative of simulations, in accordance with embodiments of the present invention.
Figure 11:
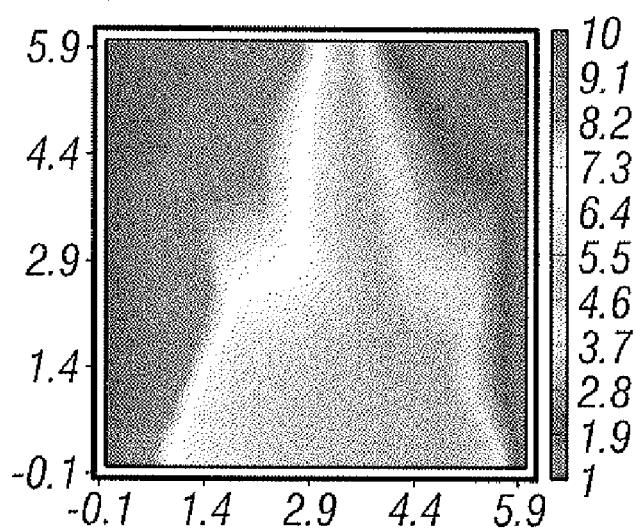
Figure 13:
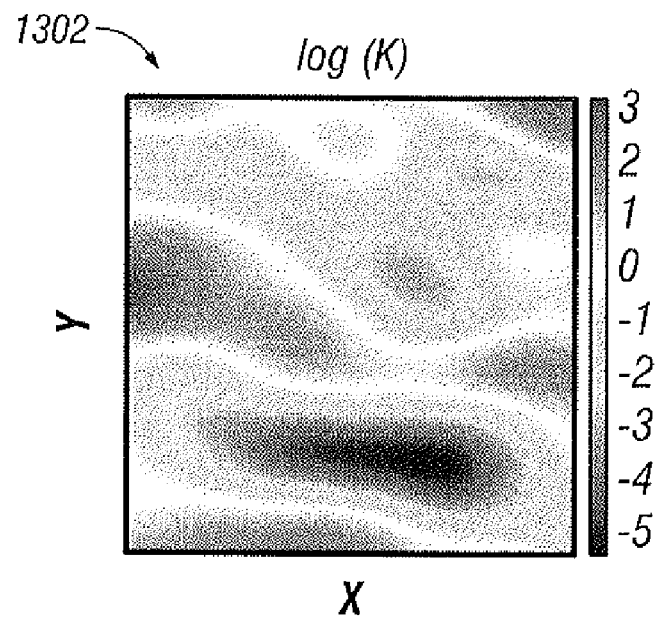
Figure 13:
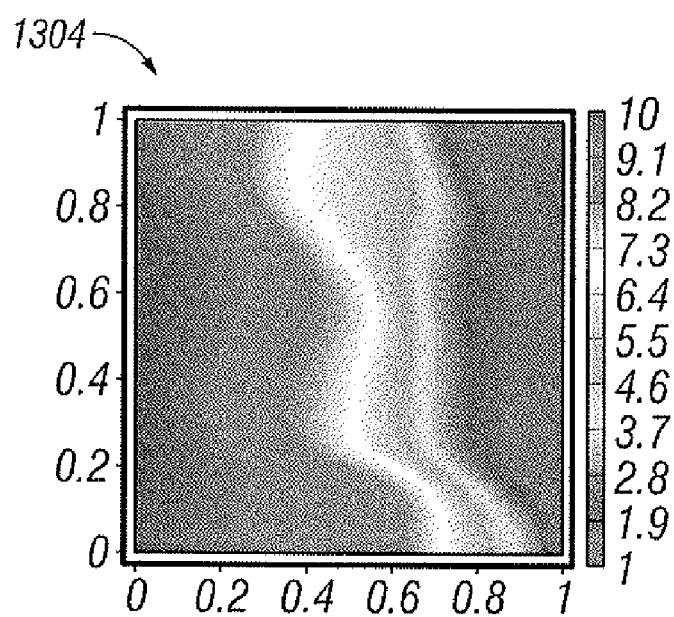
Figure 15:
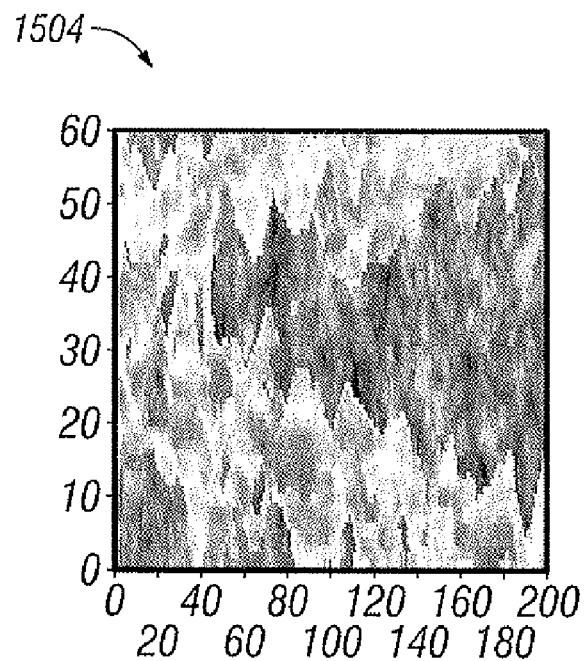
Figure 15:
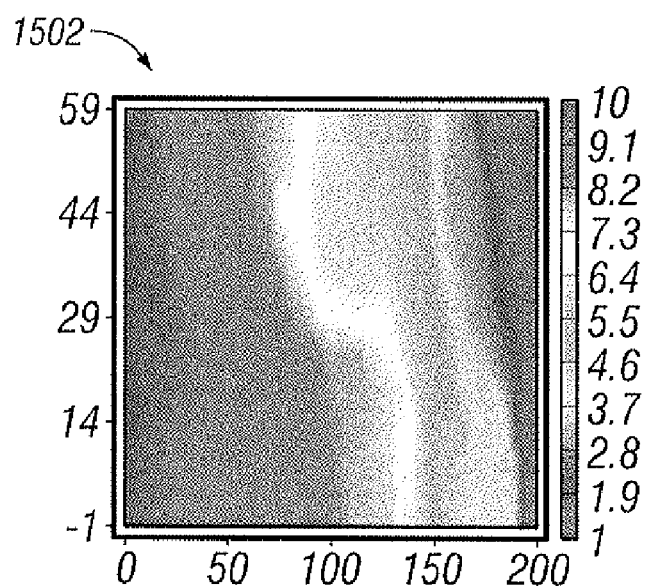

In equation (16), $u(x)$ and $u^{\mathring{a}}(x)$ belong to $H^1(\Omega)$. The heterogeneous coefficient matrix, $K(x) \in L^\infty(\Omega)^{2\times 2}$ is illustrated in FIGS. 11, 13, and 15 for each Test case. The respective upscaled $K^{\mathring{a}}(x)$ is generally obtained by utilizing [Steps—1]-[Steps—4] described earlier herein. The same BVP will be performed in all the cases.

All the simulations were performed using triangular finite element mesh and, for each case, the physical mesh was kept constant. Moreover, the elements were conforming to the $k(x)$ values, meaning that the value of the coefficient was defined in the center of the cell.

From theoretical results, it is known that the pressure solution converges in the strong convergence, meaning that the $L^2$-error between heterogeneous and upscaled solutions, $\|u(x)-u^{\mathring{a}}(x)\|_2$, drops at the same rate (or faster) than the refinement rate of the media. This is verified to be true by the numbers shown in column 2 of Tables 7-9 herein. Indeed, the numbers in the column 2 in Tables 7-9 indicate that upscaling by use of the analytical tensor leads to a strong convergence of the flow solutions, in agreement with the literature.

Figure 12:
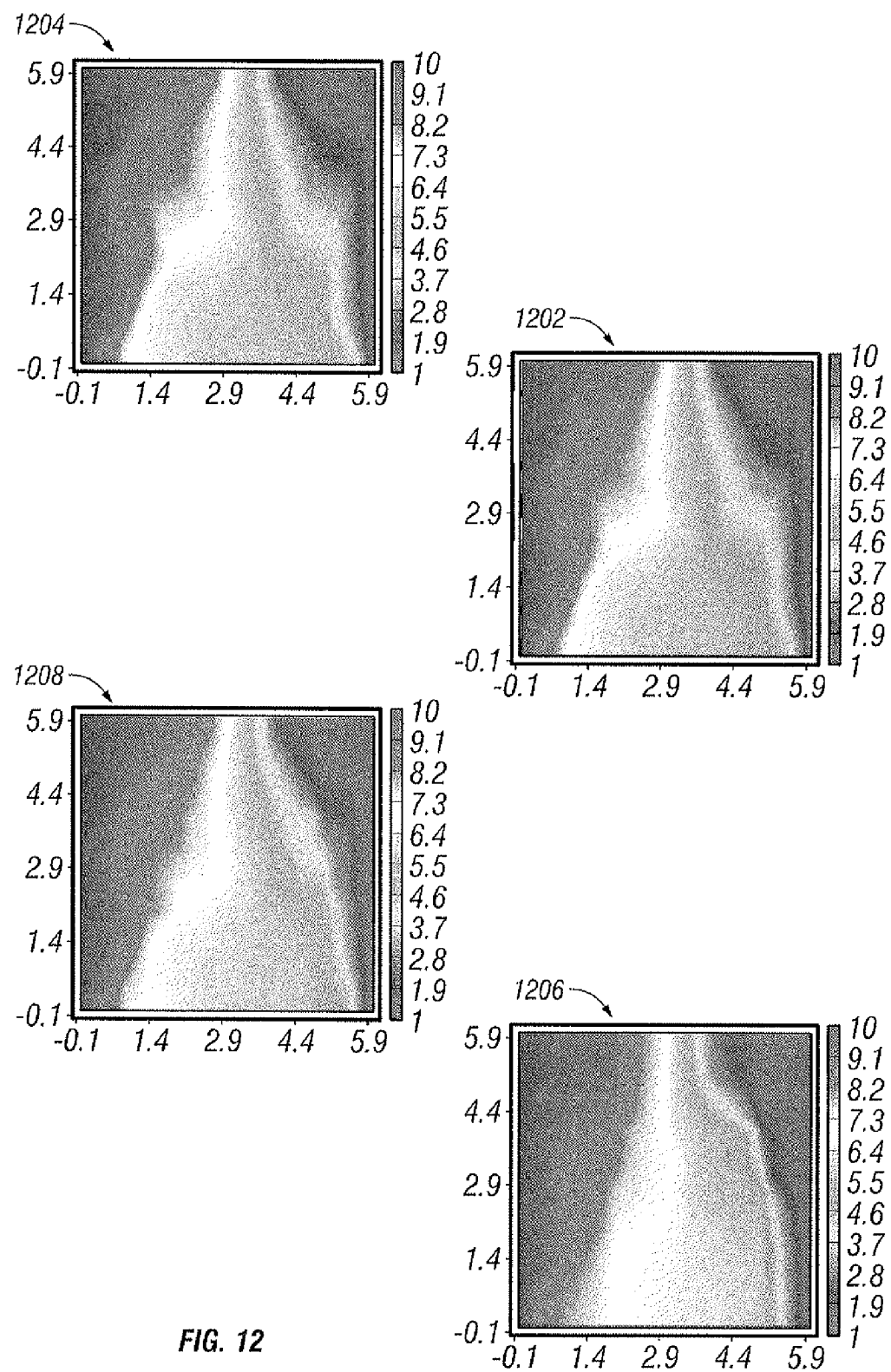

FIG. 11 generally illustrates a graph 1102 of K(x) from equation (3) with 120×120 values, where the dark blue region, k=0.1, at the light blue k=1 and red k=10. Plot 1104, which is shown in FIG. 11 below graph 1102 represents the solution of equation (16) (left) in Ω=[0,6]×[0,6]. Next, the various possible upscaled solutions are computed by solving the equivalent equation (16) (right) by using 48×48, 24×24, 12×12, and 6×6, upscaled analytical tensors, respectively, as indicated in FIG. 12 with respect to graphs 1202, 1204, 1206, and 1208. Results for the error between the heterogeneous and respective upscaled solutions are presented in Table 7 below. Observe that the first graph 1204 of FIG. 12 approximates best the heterogeneous solution—graph 1102—from FIG. 11.

Such simulations were performed in a fixed mesh of size 121×121 nodes. The initial k(x) has 120×120 values which then were replaced by the equivalents 48×48, 24×24, 12×12, and 6×6, analytical upscaled tensors. The errors between the heterogeneous and upscaled pressure and velocity, $v=(v_1,v_2)$, computed as $\|v-v^{a}\|_2=\|(v_1-v_1^{a})+(v_2-v_2^{a})\|_2$ are presented in Table 7. From which, one can conclude that indeed the error in the pressure solution dropped at the rate r=0.5, agreeing with the refinement that doubled at each stage.

TABLE 7

| Number of Analytical Upscaled tensors | $\|u(x) - u^a(x)\|_2$ | $\|v(x) - v^a(x)\|_2$ |
|---|---|---|
| 6 × 6 | 7.3465e−001 | 2.9194e+000 |
| 12 × 12 | 3.2851e−001 | 2.0796e+000 |
| 24 × 24 | 1.3892e−001 | 1.4971e+000 |
| 48 × 48 | 9.2937e−002 | 1.1410e+000 |

Errors from successive refinement of the initial 6×6 upscaled media are presented on Table 7. The heterogeneous k(x) has 120×120 values.

The field k(x) is a realization of a log-normal homogeneous stochastic process $Y(x,\omega)=\log(k(x,\omega))$, with mean or expectation $E[Y(x,\omega)]=-1$ on a domain Ω=[0,1]×[0,1]. In this case, $Y(x,\omega)$ is a Gaussian process with covariance kernel given by:

$$R(x, y) = \sigma^2 \exp\left(-\frac{|x_1 - x_2|^2}{2L_1^2} - \frac{|y_1 - y_2|^2}{2L_2^2}\right)$$

The field is shown in FIG. 13 with standard deviation σ=4 and correlation length in x-direction, $L_1$=0.1 and, $L_2$=0.2, the correlation in the y-direction. The minimum and maximum values of k(x) are 4.1804e−003 and 2.3311e+001, respectively (see graph 1302 of FIG. 13).

Figure 14:
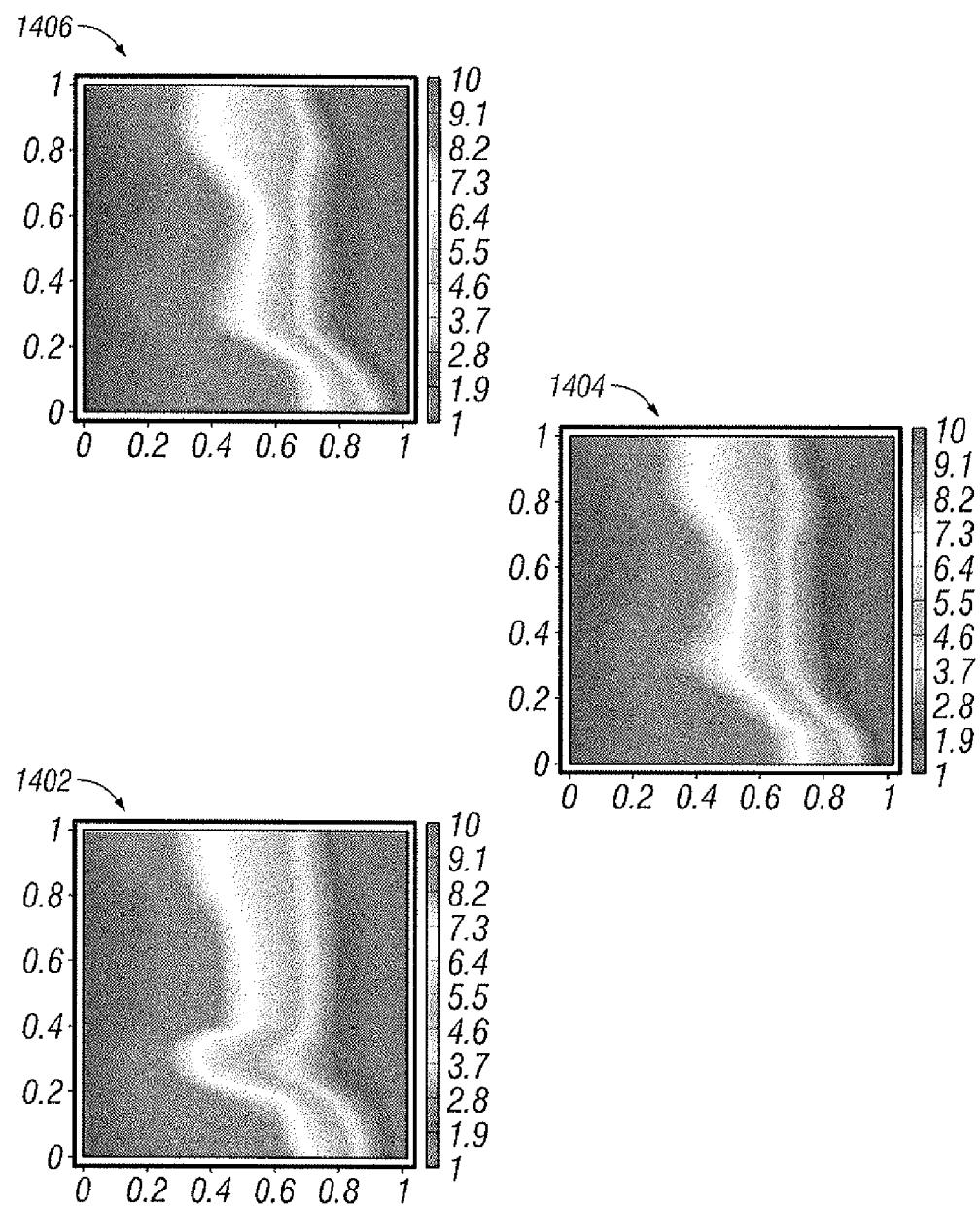

FIG. 14 illustrates from top to bottom, respective graphs 1402 and 1404, depicting upscaled solutions using 20×20, 10×10, 5×5, upscaled analytical tensors, respectively. Results for the error between the heterogeneous solution (equation (16)—left) and respective upscaled solutions (equation (16)—right) are presented in Table 8 below.

TABLE 8

| Number of Analytical Upscaled tensors | $\|u(x) - u^a(x)\|_2$ | $\|v(x) - v^a(x)\|_2$ |
|---|---|---|
| 5 × 5 | 4.1785e−001 | 6.1118e+000 |
| 10 × 10 | 1.1949e−001 | 4.0393e+000 |
| 20 × 20 | 3.2306e−002 | 1.9502e+000 |

In Table 8, errors from successive refinement of the initial 5×5 formulations of analytical upscaled tensors are indicated. The heterogeneous k(x) has 100×100 values.

The simulations were performed in a fixed mesh of size 161×161 nodes. The errors between the heterogeneous and upscaled pressure and velocity are presented in Table 8. From such data, one can conclude that indeed the error in the pressure solution dropped at the rate r=0.5, agreeing with the refinement that doubled at each stage.

FIG. 15 illustrates graphs 1502 and 1504 indicative of the results of simulations performed in accordance with the disclosed embodiments. As indicated in graph 1502, the media is the layer 45 of the SPE10. The heterogeneous solution in ω=[0,200]×[0,60] is shown on graph 1504 of FIG. 15.

Figure 16:
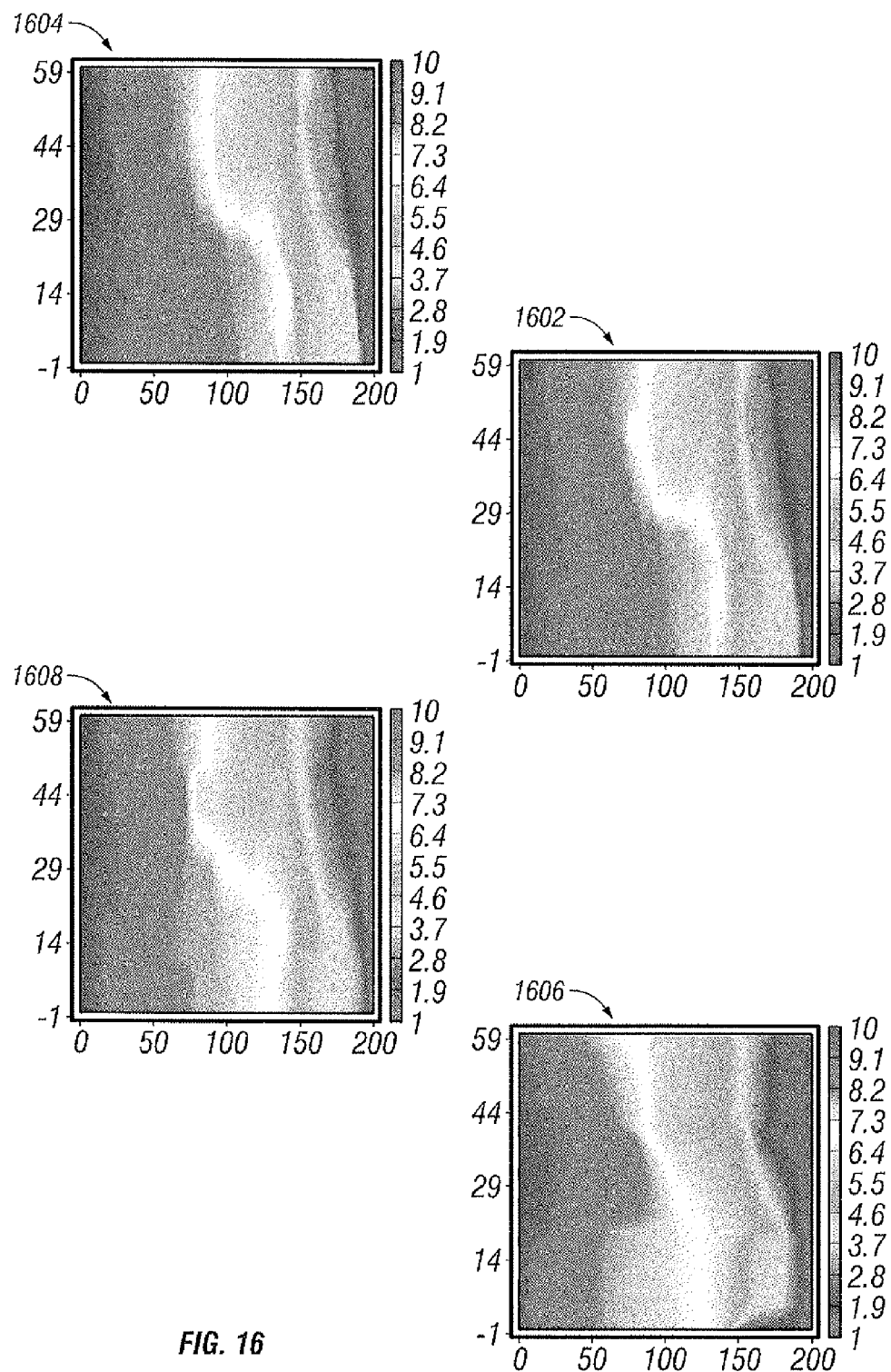

FIG. 16 illustrates graphs 1602, 1604, 1606 and 1606, also indicative of the results of simulations performed in accordance with the disclosed embodiments. Note that the problem statement specified that the intent and the basis for comparison were to "compare accuracy of solution with cost, which would be measured by the size of the coarse model rather than by CPU time". Here, only the upscaled solutions are computed and compared with the fine-scale solutions, using the sequence 100×30, 40×12, 20×6 and 10×3 upscaled analytical tensors, as illustrated in FIG. 16 respectively at graphs 1602, 1604, 1606, and 1608. The mesh size was fixed at 401×121, corresponding to $dx_1=dx_2=0.5$. From top to bottom, as indicated in FIG. 16, the upscaled solutions using 100×30, 40×12, 20×6 and 10×3, analytical upscaled tensors are illustrated, respectively. Results for the error between the heterogeneous and upscaled solutions are presented in Table 9 below. Observe that the first upscaled solution (i.e., see graph 1602) approximates best the heterogeneous solution, as expected. Followed by the coarser solutions.

TABLE 9

| Number of Analytical Upscaled tensors | $\|u(x) - u^a(x)\|_2$ | $\|v(x) - v^a(x)\|_2$ |
|---|---|---|
| 10 × 3 = 5% | 4.6068e−001 | 5.7338e+000 |
| 20 × 6 = 10% | 2.8567e−001 | 5.0144e+000 |
| 40 × 12 = 20% | 1.1535e−001 | 4.0213e+000 |
| 100 × 30 = 50% | 3.9758e−002 | 2.3712e+000 |

Errors from successive refinement of the initial 10×3 analytical upscaled media. The heterogeneous k(x) has 200×60 values.

Based on the foregoing, it can be appreciated that an analytical form for computing the effective diffusion tensor is disclosed herein, wherein the variable coefficient is locally isotropic, K(x)=k(x)I, wherein k(x) is a scalar function (and not necessarily periodic) and may be defined as a step function. As explained herein, currently, obtaining similar results require a special (re)design of a numerical code and it is computationally demanding. Even though the analytical form is proposed by empirical means, resulting from extensive numerical experiments, the disclosed embodiments agree with known analytical and numerical results, within less than, for example, 3% on average. The proposed analytical upscaled tensor approximates the tensors computed from solving the periodic cell-problem in the context of classical homogenization theory. The diagonal values are derived by an averaging procedure of the Cardwell and Parsons bounds. The off-diagonals are computed from rotation of an angle related to the center of mass of the unit cell.

While the present invention has been particularly shown and described with reference to embodiments or alternative embodiments, it will be understood by those skilled in the art that various changes in form and detail may be made therein without departing from the spirit and scope of the invention. Furthermore, as used in the specification and the appended claims, the term "machine" "computer" or "system" or "computer system" or "computing device" or "data processing apparatus" includes any data processing system including, but not limited to, personal computers, servers, workstations, network computers, main frame computers, routers, switches, telephones, etc., and any other machine/system capable of processing, transmitting, receiving, capturing and/or storing data.

Note that all documents cited in the "Detailed Description of the Invention" section of this disclosure are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. For example, it can be appreciated that the disclosed method and other embodiments discussed herein can be extended to 3-dimensional scenarios. It is therefore intended to cover in the appended claims all such changes and modifications that are within the scope of this invention.

What is claimed is:

1. A computer-implemented method for modeling an average flow of a substance or heat through a periodic and a non-periodic material, said method comprising:

said computer defining an effective conductivity tensor, $K^å$, comprising main diagonal values and off-diagonal values, wherein said main diagonal values are computed using $$K_{ii}^{å} = 0.5(K_{ii}^{a} + K_{ii}^{g})$$

where $K_{ii}^{a}$ and $K_{ii}^{g}$ are arithmetic and geometric averages of Cardwell and Parsons bounds, and wherein said off-diagonal values are computed using $$K_{ji}^{å} = K_{ij}^{å} = -a_2 \sin(2\theta) \text{ if } K_{ii}^{å} \neq K_{jj}^{å} \text{ wherein}$$

$$a_2 = \frac{K_{ii}^{å} - K_{jj}^{å}}{2\cos(2\theta)}, \text{ or}$$

$$K_{ji}^{å} = K_{ij}^{å} = -b_2 \sin(2\theta) \text{ if } K_{ii}^{å} = K_{jj}^{å} \text{ wherein}$$

$$b_2 = \frac{\hat{K}_{ii} + \hat{K}_{jj}}{4} - \frac{\tilde{K}_{ii} + \tilde{K}_{jj}}{4};$$

said computer identifying a pertinent angle of rotation, $\theta$, that defines said off-diagonal values; and
said computer determining a sign of said off-diagonal values to model said flow of said substance or heat through said periodic and said non-periodic material.

2. The method of claim 1 wherein said substance comprises at least one of the following: a liquid, a gas, or combination thereof.

3. The method of claim 1 wherein said effective conductivity tensor is anisotropic or isotropic.

4. The method of claim 1, wherein said effective conductivity tensor is at least one of a non-diagonal, a diagonal, and a full tensor.

5. The method of claim 1 further comprising said computer utilizing said effective conductivity tensor to model crude oil recovery.

6. The method of claim 1 further comprising said computer utilizing said effective conductivity tensor to model oil shale recovery.

7. The method of claim 1 further comprising said computer utilizing said effective conductivity tensor to model heat conduction.

8. The method of claim 1 wherein said effective conductivity tensor comprises:
diagonals $K^å_{11}$ and $K^å_{22}$; and off-diagonals $K^å_{12}$ and $K^å_{21}$.

9. A system for modeling an average flow of a substance or heat through a periodic and a non-periodic material, said system comprising:

a processor;
a data bus coupled to said processor; and
a non-transitory computer readable storage medium comprising computer instructions, said computer-readable storage medium being coupled to said data bus, said computer instructions executable by said processor for:
defining an effective conductivity tensor, $K^å$, comprising main diagonal values and off-diagonal values, wherein said main diagonal values are computed using $$K_{ii}^{å} = 0.5(K_{ii}^{a} + K_{ii}^{g})$$

where $K_{ii}^{a}$ and $K_{ii}^{g}$ are arithmetic and geometric averages of Cardwell and Parsons bounds, and wherein said off-diagonal values are computed using $$K_{ji}^{å} = K_{ij}^{å} = -a_2 \sin(2\theta) \text{ if } K_{ii}^{å} \neq K_{jj}^{å} \text{ wherein}$$

$$a_2 = \frac{K_{ii}^{å} - K_{jj}^{å}}{2\cos(2\theta)}, \text{ or}$$

$$K_{ji}^{å} = K_{ij}^{å} = -b_2 \sin(2\theta) \text{ if } K_{ii}^{å} = K_{jj}^{å} \text{ wherein}$$

$$b_2 = \frac{\hat{K}_{ii} + \hat{K}_{jj}}{4} - \frac{\tilde{K}_{ii} + \tilde{K}_{jj}}{4};$$

identifying a pertinent angle of rotation, $\theta$, that defines said off-diagonal values; and
determining a sign of said off-diagonal values to model said flow of said substance or heat through said periodic and said non-periodic material.

10. The system of claim 9 wherein said substance comprises at least one of the following: a liquid, a gas, or combination thereof.

11. The system of claim 9 wherein said effective conductivity tensor is anisotropic or isotropic.

12. The system of claim 9 wherein said effective conductivity tensor is at least one of a non-diagonal, a diagonal, and a full tensor.

13. The system of claim 9 wherein said instructions are further configured for utilizing said effective conductivity tensor to model crude oil recovery.

14. The system of claim 9 wherein said instructions are further configured utilizing said effective conductivity tensor to model oil shale recovery.

15. The system of claim 9 wherein said instructions are further configured utilizing said effective conductivity tensor to model heat conduction.

16. The system of claim 9 wherein said effective conductivity tensor comprises:
diagonals $K^{å}_{11}$ and $K^{å}_{22}$; and off-diagonals $K^{å}_{12}$ and $K^{å}_{21}$.

17. A non-transitory computer-readable storage medium system for modeling an average flow of a substance or heat through a periodic and a non-periodic material, said computer-readable storage medium storing computer program code, said computer program code comprising computer program instructions executable by a processor, said program instructions comprising:
program instructions to define an effective conductivity tensor, $K^{å}$, comprising main diagonal values and off-diagonal values, wherein said main diagonal values are computed using $$K^{å}_{ii} = 0.5(K^{a}_{ii} + K^{g}_{ii})$$

where $K^{a}_{ii}$ and $K^{g}_{ii}$ are arithmetic and geometric averages of Cardwell and Parsons bounds, and wherein said off-diagonal values are computed using $$K^{å}_{ji} = K^{å}_{ij} = -a_2 \sin(2\theta) \text{ if } K^{å}_{ii} \neq K^{å}_{jj} \text{ wherein}$$

$$a_2 = \frac{K^{å}_{ii} - K^{å}_{jj}}{2\cos(2\theta)}, \text{ or}$$

$$K^{å}_{ji} = K^{å}_{ij} = -b_2 \sin(2\theta) \text{ if } K^{å}_{ii} = K^{å}_{jj} \text{ wherein}$$

$$b_2 = \frac{\hat{K}_{ii} + \hat{K}_{jj}}{4} - \frac{\tilde{K}_{ii} + \tilde{K}_{jj}}{4};$$

program instructions to identify a pertinent angle of rotation, $\theta$, that defines said off-diagonal values; and
program instructions to determine a sign of said off-diagonal values to model said flow of said substance or heat through said periodic and said non-periodic material.

18. The non-transitory computer-readable storage medium of claim 17 wherein said substance comprises at least one of the following: a liquid, a gas or combination thereof.

19. The non-transitory computer-readable storage medium of claim 17 wherein said effective conductivity tensor is anisotropic or isotropic.

20. The non-transitory computer-readable storage medium of claim 17 wherein said effective conductivity tensor comprises:
diagonals $K^{å}_{11}$ and $K^{å}_{22}$;

and off-diagonals $K^{å}_{12}$ and $K^{å}_{21}$.

* * * * *